(12) United States Patent
Deutscher et al.

(10) Patent No.: US 7,496,845 B2
(45) Date of Patent: Feb. 24, 2009

(54) INTERACTIVE PRESENTATION VIEWING SYSTEM EMPLOYING MULTI-MEDIA COMPONENTS

(75) Inventors: John Deutscher, Sammamish, WA (US); Sunit Gogia, Kirkland, WA (US); Brian Snyder, Seattle, WA (US); Brian Honey, Auburn, WA (US); Amy Beauford, Bellevue, WA (US); Daniel Orme-Doutre, Snohomish, WA (US); Becky Johnson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 970 days.

(21) Appl. No.: 10/283,467

(22) Filed: Oct. 30, 2002

(65) Prior Publication Data

US 2003/0174160 A1 Sep. 18, 2003

Related U.S. Application Data

(60) Provisional application No. 60/364,510, filed on Mar. 15, 2002.

(51) Int. Cl.
G06F 15/16 (2006.01)
(52) U.S. Cl. ...................... 715/726; 715/721
(58) Field of Classification Search ................ 715/732, 715/730–731, 716, 717–726, 740, 811, 745, 715/817–819; 725/112, 135; 707/512, 500, 707/501; 709/231, 217
See application file for complete search history.

(56) References Cited

U.S. PATENT DOCUMENTS

| 5,613,909 | A | 3/1997 | Stelovsky |
| 5,659,793 | A | 8/1997 | Escobar et al. |
| 5,675,752 | A | 10/1997 | Scott et al. |
| 6,072,480 | A | 6/2000 | Gorbet et al. |
| 6,317,141 | B1 | 11/2001 | Pavely et al. |
| 6,473,096 | B1 | 10/2002 | Kobayashi et al. |
| 6,484,189 | B1 | 11/2002 | Gerlach et al. |
| 6,515,656 | B1 * | 2/2003 | Wittenburg et al. ......... 345/418 |
| 6,544,294 | B1 | 4/2003 | Greenfield |
| 6,560,281 | B1 * | 5/2003 | Black et al. ................. 375/240 |
| 6,577,324 | B1 * | 6/2003 | Palmer et al. ............... 715/705 |
| RE38,609 | E | 10/2004 | Chen et al. |

(Continued)

FOREIGN PATENT DOCUMENTS

WO WO0135056 5/2001

OTHER PUBLICATIONS

Brenneis, Lisa, Final Cut Pro 3 for Macintosh: Visual QuickPro Guide, Apr. 3, 2002, Sections using markers, Navigating in the Timeline, Working with Items in the Timeline, Performing Edits in the Canvas, Importing Media.

(Continued)

Primary Examiner—Steven P Sax
(74) Attorney, Agent, or Firm—Lyon & Harr, LLP; Richard T. Lyon

(57) ABSTRACT

An interactive, multi-media presentation viewing system and process for viewing educational or business presentations integrating presentation graphics in the form of presentation slides, video, audio, text, and other streaming media into a powerfully coordinated viewing experience for the end user. The viewing system is an aggregate of synchronized presentation graphics, video, and text displays employing a graphical user interface that allows the user to control all aspects of media playback.

49 Claims, 12 Drawing Sheets

U.S. PATENT DOCUMENTS

| | | | |
|---|---|---|---|
| 6,834,371 B1 | 12/2004 | Jensen et al. | |
| 6,907,570 B2 * | 6/2005 | Amir et al. | 715/720 |
| 6,973,483 B2 | 12/2005 | Hewitt et al. | |
| 6,996,780 B2 | 2/2006 | Estrada | |
| 7,046,258 B1 | 5/2006 | Naito et al. | |
| 7,102,643 B2 | 9/2006 | Moore et al. | |
| 7,103,842 B2 | 9/2006 | Masuda et al. | |
| 7,117,429 B2 | 10/2006 | Vedullapalli et al. | |
| 7,155,676 B2 | 12/2006 | Land et al. | |
| 7,412,533 B1 * | 8/2008 | Johnson et al. | 709/231 |
| 2001/0033296 A1 | 10/2001 | Fullerton et al. | |
| 2001/0050681 A1 | 12/2001 | Keys | |
| 2002/0052976 A1 | 5/2002 | Loesch | |
| 2002/0062403 A1 * | 5/2002 | Burnett et al. | 709/318 |
| 2002/0109712 A1 | 8/2002 | Yacovone et al. | |
| 2002/0140719 A1 * | 10/2002 | Amir et al. | 345/716 |
| 2002/0180803 A1 * | 12/2002 | Kaplan et al. | 345/810 |
| 2003/0088613 A1 * | 5/2003 | Goldschmidt Iki et al. | 709/202 |
| 2003/0090507 A1 | 5/2003 | Randall et al. | |
| 2003/0170006 A1 * | 9/2003 | Bogda et al. | 386/96 |
| 2003/0203342 A1 | 10/2003 | Bowers | |
| 2004/0014013 A1 | 1/2004 | Diesel et al. | |
| 2004/0177096 A1 * | 9/2004 | Eyal et al. | 707/104.1 |
| 2004/0201610 A1 * | 10/2004 | Rosen et al. | 345/731 |
| 2004/0268224 A1 | 12/2004 | Balkus et al. | |
| 2006/0031147 A1 | 2/2006 | Bell et al. | |
| 2007/0055939 A1 | 3/2007 | Furlong et al. | |

OTHER PUBLICATIONS

European Search Report, Application No. EP03014309.3, completed Feb. 28, 2006, received Mar. 6, 2006.

Growin et al. Using Authorware, Aug. 2001, Macromedia, Inc., pp. 13-14, 33-34, 243, 307-308.

Microsoft, Introducing Microsoft Producer Overview Whitepaper, Jun. 20, 2001, Microsoft Corporation, http://web.archive.org/web/200100815150150/www.microsoft.com/windows/windowsmedia/en/technologies/Producer/overview.asp.

Microsoft, Overview of Microsoft Producer rich-media presentation, Jun. 20, 2001, Microsoft Corporation, Demo downloaed from http://web.archive.org/web/20010815150150/http://download.microsoft.com/download/winmediatech40/ove/1/NT5/EN-US/overview.exe.

Microsoft, Microsoft Producer FAQ, Jun. 19, 2001, Microsoft Corporation, http://web.archive.org/web/20010706191259/www.microsoft.com/windows/windowsmedia/en/technologies/Producer/FAQ.asp.

Microsoft, Introducing Microsoft Producer, Jun. 20, 2001, Microsoft Corporation, http://web.archive.org/web/20010625110103/www.microsoft.com/windows/windowsmedia/en/technologies/Producer/overview.asp.

Microsoft, Microsoft Producer Demos, Jun. 20, 2001, Microsoft Corporation, http://web.archive.org/web/20010815150150/www.microsoft.com/windows/windowsmedia/en/technologies/Producer/demos.asp.

Alvin, Tan, Office Action, U.S. Appl. No. 10/183,830, mailed Jan. 12, 2006.

Alvin, Tan, Office Action, U.S. Appl. No. 10/183,830. Mailed Aug. 8, 2006.

Alvin, Tan, Office Action, U.S. Appl. No. 10/183,830, Mailed Nov. 16, 2006.

Alvin, Tan, Office Action, U.S. Appl. No. 10/183,830, Mailed Jan. 9, 2007.

Alvin, Tan, Office Action, U.S. Appl. No. 10/183,830, Mailed Aug. 21, 2007.

Alvin, Tan, Office Action, U.S. Appl. No. 10/183,830, Mailed Jan. 25, 2008.

* cited by examiner

INTERACTIVE PRESENTATION VIEWING SYSTEM EMPLOYING MULTI-MEDIA COMPONENTS

CROSS-REFERENCE TO RELATED APPLICATIONS

This application claims the benefit of a previously-filed provisional patent application Ser. No. 60/364,510 filed on Mar. 15, 2002.

BACKGROUND

1. Technical Field

The invention is related to an educational or business presentation viewing system having multi-media components, and more particularly to an interactive, multi-media presentation viewing system that integrates presentation graphics in the form of presentation slides, video, audio, text, and other streaming media.

2. Background Art

Multimedia presentations in their simplest form involve the use of a variety of media, such as video, audio, slideshows, and text to present scripted presentations to mass audiences for such purposes as virtual classrooms or other educational and business presentations. Though there has been a recent explosion in the use of such multimedia presentations, very little work is ongoing in the field of interactive multimedia presentations. Interactive multimedia presentations have the promise of providing all new presentation and learning environments. Rather than the traditional canned presentation or lecture, a viewer of an interactive multimedia presentation would be able to play back the presentation while interacting with it to view or review specific sections, access additional information, search and even bookmark the presentation.

SUMMARY

The present invention is directed toward an interactive, multi-media presentation viewing system that integrates presentation graphics in the form of presentation slides, video, audio, text, and other streaming media into a powerfully coordinated viewing experience for the end user. The viewing system is an aggregate of synchronized presentation graphics, video, and text displays employing a graphical user interface to control all aspects of media playback including location of playback, scrolling, view control, audio volume, thumbnails, search/file toolbox, language selection, book marks, internal/external links, and the like. One purpose of the system is to present scripted presentations to mass audiences such as virtual classrooms or other educational or business presentations.

In its most compact form, the presentation viewing system and process according to the present invention displays a window to the user having a presentation video sector that plays a video or audio program, a presentation slide sector that displays presentation slides associated with a different parts of the program, and a content sector.

The presentation video sector generally includes a playback space in which the video frames associated with a video program are played or images associated with an audio program are displayed. In addition, a set of control buttons is displayed which are selected by the user to control the playing of the program. For example, controls for starting, stopping, advancing and rewinding the program can be included. In regard to the displaying images in the playback space when the program is an audio only program, this can include displaying a blank screen, a static image (such as one reading "Audio Only"), or an animation. The presentation video sector can also include an elapsed-time counter display showing in one embodiment both an elapse time indicative of the elapsed running time of the program and the total running time of the program.

The presentation slide sector is designed to automatically display the particular slide in the presentation slide sector that is scheduled to be shown when the program reaches a prescribed elapsed running time. The exception is when a contrary user-generated control instruction directs otherwise, as will be discussed shortly.

The content sector is generally employed by the user to interact with the presentation viewing window. In the aforementioned compact embodiment of the window, the content sector displays a list of subject matter topics, each of which is associated with a different part of the presentation. The user interacts with the window by selecting a subject matter topic via conventional graphic user interface methods in order to control what part of the program is played and what presentation slide is displayed. In order to accomplish this interface each subject matter topic is assigned an elapsed running time of the program that corresponds to the beginning of a portion of the program related to that topic. The topic associated the portion of the program currently being played is highlighted, and displayed at the top of the content sector with subsequent topics being listed below it in order of their assigned elapsed running time from soonest to latest. This is unless the user selects a different subject matter topic.

In the case where the user selects a different subject matter topic from the list in lieu of currently highlighted topic, several things happen. First, the selected topic is highlighted instead of the previously highlighted topic. In addition, the program being played in the presentation video sector is restarted at a point corresponding to the elapse running time assigned to the selected topic, and the slide that is scheduled to be shown when the program is at the point corresponding to the elapse running time assigned to the selected topic, is displayed in the presentation slide sector. In this way, the user can immediately jump to a particular subject of interest within the presentation.

In some cases, there are too many subject matter topics to list in their entirety within a space allotted to the content sector. When this occurs, the topics are displayed as described previously to the extent that they will fit into the allotted space. Additionally, a scroll bar is displayed in the content sector, which allows the user to scroll the list of subject matter topics up and down so as to bring any of the topics desired into view.

It is noted that the list of subject matter topics can also include one or more links to video or audio programs other than the program being played in the presentation video sector. Each of these links is assigned an elapsed running time of the program, and whenever the program playing in the presentation video sector reaches the elapsed running time assigned to a link, it is paused and a demonstration window is opened. The video or audio presentation associated with the link is then played in the demonstration window. When the presentation being played in the demonstration window is complete, the window closes and the previously paused program playing in the presentation video sector is started from where it left off. It is also noted that the same scenario is followed if a user selects a link in the list of subject matter topic displayed in the content sector. In addition, the demonstration window can be closed by the user before the presentation playing therein is complete. This results in the program playing in the presentation video sector being immediately restarted from where it left off.

In richer versions of the presentation viewing system and process, the content sector is used to display other useful interactive items, as well. For example, the content sector can be used to display a list of audio transcript segments or thumbnail images of the presentation slides. To this end, the content sector also includes buttons that the user would select to activate the various display modes. Thus, the sector could include buttons to activate the mode where the list of subject matter topics is displayed (e.g., a contents button), the mode where the list of transcript segments is displayed (e.g., a transcript button) and the mode where thumbnail images are displayed (e.g., a thumbnails button). If other display modes are available for the content sector, it is preferred that the mode where the list of subject matter topics is displayed be designated as the default mode and be displayed when the presentation viewing window is initially opened.

The content sector can also be scaled in size within the presentation viewing window. This is accomplished as follows. Initially, the content sector is displayed at an intermediate size. When displayed in the intermediate state, a pair of resizing buttons are shown. A first of the resizing buttons increases the size of the content sector within the overall presentation viewing window to a prescribed maximum size, while decreasing the size of one or more adjacent sectors to make room. The other of the resizing buttons reduces the content sector to a prescribed minimum size and increases the size of one or more adjacent sectors to substantially fill the vacant space in the window left by the decrease in the content sector size. When the content sector is displayed at its maximum size, a resizing button is included for returning the sector to its intermediate size, and when the sector is displayed at is minimum size, a resizing button is included to increase the sector to its intermediate size In regard to the mode where the list of transcript segments is displayed in the content sector upon selection of a transcript button by the user, it is noted that each segment has a prescribed length such as a phrase, sentence, a prescribed number of sentences, paragraph, or a prescribed number of paragraphs. Each segment is also assigned an elapsed running time of the program that corresponds to the portion of the program where the segment begins. It is further noted that the transcript segments need not be direct translations of the audio track of the program being played in the presentation video sector. Rather, a segment could be a modified or annotated version of the audio track, a translation into another language, or even a series of signing symbols for the deaf.

In the absence of input from the user, the transcript segment associated the portion of the program currently being played is highlighted and displayed at the top of the content sector with subsequent topics being listed below it in order of their assigned elapsed running time from soonest to latest. However, if the user selects a displayed transcript segment, the selected segment is highlighted instead of the previously highlighted segment. In addition, the program being played in the presentation video sector is restarted at a point corresponding to the elapse running time assigned to the selected segment, and the slide that is scheduled to be shown when the program is at the point corresponding to the elapse running time assigned to the selected segment is displayed in the presentation slide sector. Thus, like the subject matter topic selection feature described previously, this feature is useful for jumping to a particular subject within the presentation that the user is interested in playing.

When there are too many transcript segments to list in their entirety within a space allotted to the content sector (as will typically be the case), the segments are displayed to the extent that they will fit into the allotted space. A scroll bar is included in the content sector to allow the user to scroll through the list of transcript segments so as to display any of the segments desired.

In regard to the mode where the presentation slide thumbnail images are is displayed in the content sector upon selection of a thumbnails button by the user, each thumbnail image is assigned an elapsed running time of the program that corresponds to the point in the program that the presentation slide depicted by the thumbnail image is scheduled to be shown in the presentation slide sector. In this case, without input from the user, the thumbnail image associated the portion of the program currently being played is highlighted and displayed in the upper left side of the content sector with subsequent thumbnail images being displayed in a left to right manner in one or more rows and in the order of their assigned elapsed running time from soonest to latest. However, if the user selects a displayed thumbnail image in a first prescribed manner (e.g., a standard single click maneuver), it is highlighted instead of the previously highlighted image, and the presentation slide corresponding to the thumbnail image is displayed in the presentation slide sector, regardless of the elapsed time of the program. In this way the user can review or preview a presentation slide without affecting the program playing in the presentation video sector. Alternately, if the user selects a displayed thumbnail image in a second prescribed manner (e.g., a standard double click maneuver), it is highlighted instead of the previously highlighted image, the program being played in the presentation video sector is restarted at a point corresponding to the elapse running time assigned to the selected thumbnail image, and the slide depicted by the thumbnail is displayed in the presentation slide sector. This feature is also useful for jumping to a particular subject within the presentation that the user is interested in playing.

In this case, when there are too many thumbnail images to display all of them within a space allotted to the content sector, the thumbnail images are displayed to the extent that they will fit into the allotted space. However, a scroll bar is included to allow the user to scroll through the complete set of thumbnail images.

Rich versions of the presentation viewing system and process can also include a links sector in which the user selects links to portions of the program playing in the presentation video sector, or to other files, programs and network sites. In a first mode, a list of links to other files, programs and network sites is displayed in the links sector. When a user selects one of the displayed links, a link window is opened and the file, program or network site associated with a link is displayed in the window. The user closes the link window when through with it. Each link displayed in the first mode of the links sector is either associated with the program as a whole, a portion of the program corresponding a subject matter topic, or a presentation slide. Only those links associated with the program as a whole, the portion of the program corresponding to the current subject matter topic and the currently displayed presentation slide are displayed in the links sector when it is operating its first mode.

In a second display mode, the links sector displays a search request space and search results space. In this mode, the user enters text into the search request space. For example, the request can take the form of keywords. A conventional search engine is employed to find within the program, one or more locations wherein data pertaining to the search request can be found. In the example where the request is a keyword, this search could find all the instances where the keyword appears in the audio transcript. A link is displayed to each location in the program found to have data pertaining to the search request. Theses results are displayed in the search results space. In the foregoing example this could entail displaying the transcript segment or the applicable part thereof that contains the search request keyword.

The second mode of the links sector can also include a search details space in which additional details about a link can be displayed. To take advantage of this feature the user selects the desired link using a first selection method (e.g., a single click maneuver) at which point it is highlighted and any additional details associated with the link are displayed in a search details space. The user can also select a link in the links sector using a second selection method (e.g., a double click maneuver) at which point the link is highlighted as before. However, in this case, the program being played in the presentation video sector is restarted at a point corresponding to the link, and the presentation slide that is scheduled to be shown when the program is at the point corresponding the link is displayed in the presentation slide sector. Thus, the foregoing feature provides a way fro the user to find subjects of interest within the presentation and immediately jump to that part of the program playing in the presentation video sector.

When there is not enough space allotted to the links sector to display the search request space, search results space, and search details space in their entirety at one time, a scroll bar is displayed adjacent the sector. The user employs this scroll bar in a conventional manner to scroll the links sector spaces upward or downward until the space the user desires to view can be seen. In addition, when there are too many links to display in their entirety within the space allotted to the search results space, or too many search details to display in their entirety within the space allotted to the search details space, then a scroll bar is displayed adjacent the appropriate space or spaces, which the user employs to scroll through the links or details as the case may be to bring a desired entry into view.

It is also noted that a clear button is displayed in the links sector when operated in the aforementioned second mode. When the user selects the clear button, any search request or portion thereof displayed in the search request space, any link displayed in the search results space, and any search details displayed in the search details space, are cleared.

In a third display mode, the links sector displays a bookmarks space and an add button. In this mode, the user selects the add button at which point a link is displayed in the bookmarks space to the location in the program playing in the presentation video sector corresponding to the current elapsed time of the program. In this way, any number of bookmarks to places of interest in the presentation can be created. The user can then revisit these bookmarked places. To jump to a bookmarked location via a first method, the user selects a displayed bookmark link using a first prescribed selection method (e.g., a standard single click maneuver). This highlights the selected link. The user then selects a "goto" button that is also displayed in the links sector when operating in its third mode. This causes the program being played in the presentation video sector to start playing at a point corresponding to the previously selected link. In addition, the presentation slide that is scheduled to be shown when the program is at the point corresponding to the link is displayed in the presentation slide sector. Another method of jumping to a bookmarked location involves selecting a displayed bookmark link in a second prescribed manner (e.g., by using a standard double click maneuver). In this case, the program and presentation slide immediately jump to the portion of the presentation associated with the link, without the need to select the "goto" button.

In one embodiment of the bookmark feature, the links were subject matter topic associated with the point in the program that the link was created. Thus, when the user goes to the link, the program is restarted at the beginning of the portion associated with the subject matter topic represented by the link. In another embodiment, the link is assigned the elapsed time of the program when it is created. In this case, when the user goes to the link, the program is restarted at the elapsed time assigned to the link.

It is noted that a remove button is also displayed in the links sector when operated in the aforementioned third mode. When the user selects a bookmark link displayed in the bookmarks space and then selects the remove button, the link is eliminated.

It is also noted that similar to the other modes of the links sector, when there are too many bookmark links to display in their entirety within the space allotted to the bookmarks space, a scroll bar is displayed adjacent the space. As before, the user employs the scroll bar to scroll through the links to bring a desired entry into view.

In order for the user to initiate the various above-described link sector display modes, buttons are provided. Specifically, a files button is displayed, which the user selects to activate the first display mode where links to other files, programs and network sites are provided. In addition, a search button is displayed, which the user selects to activate the second display mode where the user can search the presentation and select links to places therein. And finally, a bookmarks button is displayed, which the user selects to activate the third display mode where the user can establish and select links to places of interest in the presentation.

Still richer versions of the presentation viewing window can include a presentation information sector that displays information pertaining to the program being played in the presentation video sector, such as its title, the name of the speaker, and so on. A banner sector could also be incorporated. This sector displays at least one of a company name, a project name, and a slogan. Additionally, a counter showing both a sequence number assigned to the presentation slide currently displayed in the slide sector and a number representing the total number of presentation slides available for display in the slide sector could be added to the presentation viewing window.

Given that various versions of the presentation viewing window can include any number or all of the above-described sectors, consideration must be given to the size of the window. For example, the preferred nominal window size allows all of the aforementioned sectors to be legibly displayed. However, what if the user wants to change the size of the window? One simple solution is to scale the size of each sector proportionally in response to a command from the user to increase or decrease the overall size of the window. While this solution would work well for most resizing, there may be a point when the user is reducing the size of the window that one or more of the sectors could become so small that they are illegible. An alternate window resizing scheme would preclude this problem—namely by scaling the size of each sector based on a prescribed priority and a prescribed minimum size. Thus, for example, in response to a command from the user to decrease the overall size of the window that would result in some sectors being reduced in size beyond their prescribed minimum size, lower priority sectors would be eliminated from the window as needed in order of their assigned priority from lowest to highest to ensure enough space is provided to accommodate the remaining higher priority sectors at no less than their prescribed minimum size. This prioritized scaling process can also include rearranging the position of the remaining sectors within the window to minimize any unused window space and to maximize the size of the remaining sectors.

Another issue of concern when resizing the presentation viewing window is the resolution of the presentation slides displayed in the presentation slide sector. If the resolution of the slide display is allowed to vary with any resizing of the slide sector, the slides could become harder to read. As such, the resolution of the presentation slide sector is preferable maintained at a prescribed level even if the slide sector is increased or decreased in size.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
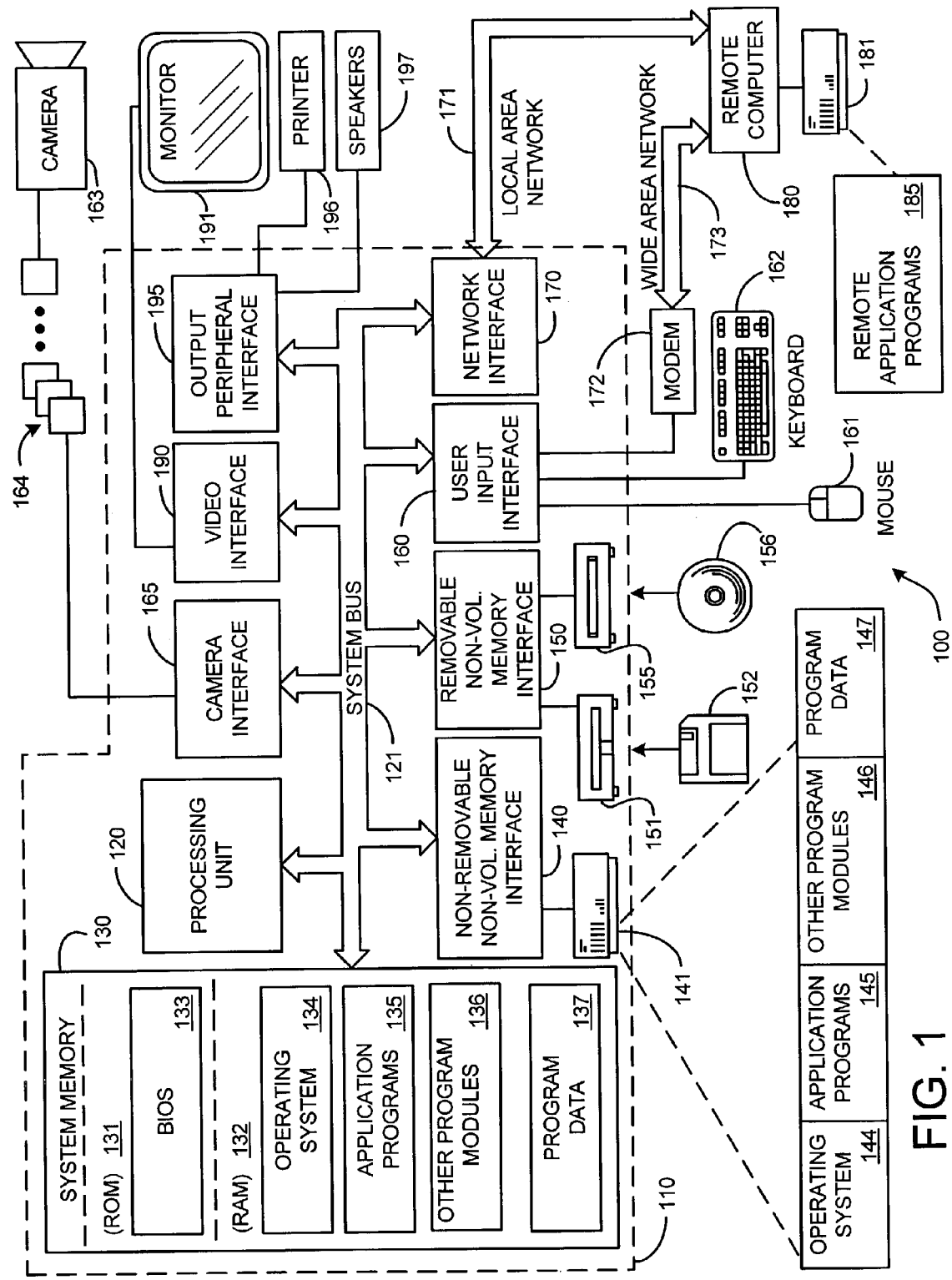
FIG. 1 is a diagram depicting a general purpose computing device constituting an exemplary system for implementing the present invention.

Before providing a description of the preferred embodiments of the presentation viewing system, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as input devices to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description section will be devoted to a description of the viewer's perspective of the presentation viewing system. This will begin with a general description of the multi-media interface window layout that the viewer sees and interacts with, when running the present presentation viewing system program on a computing device such as described above. This is then followed by more detailed descriptions of each component (i.e., sector) of the window.

1.0 The Window Layout

Figure 2:
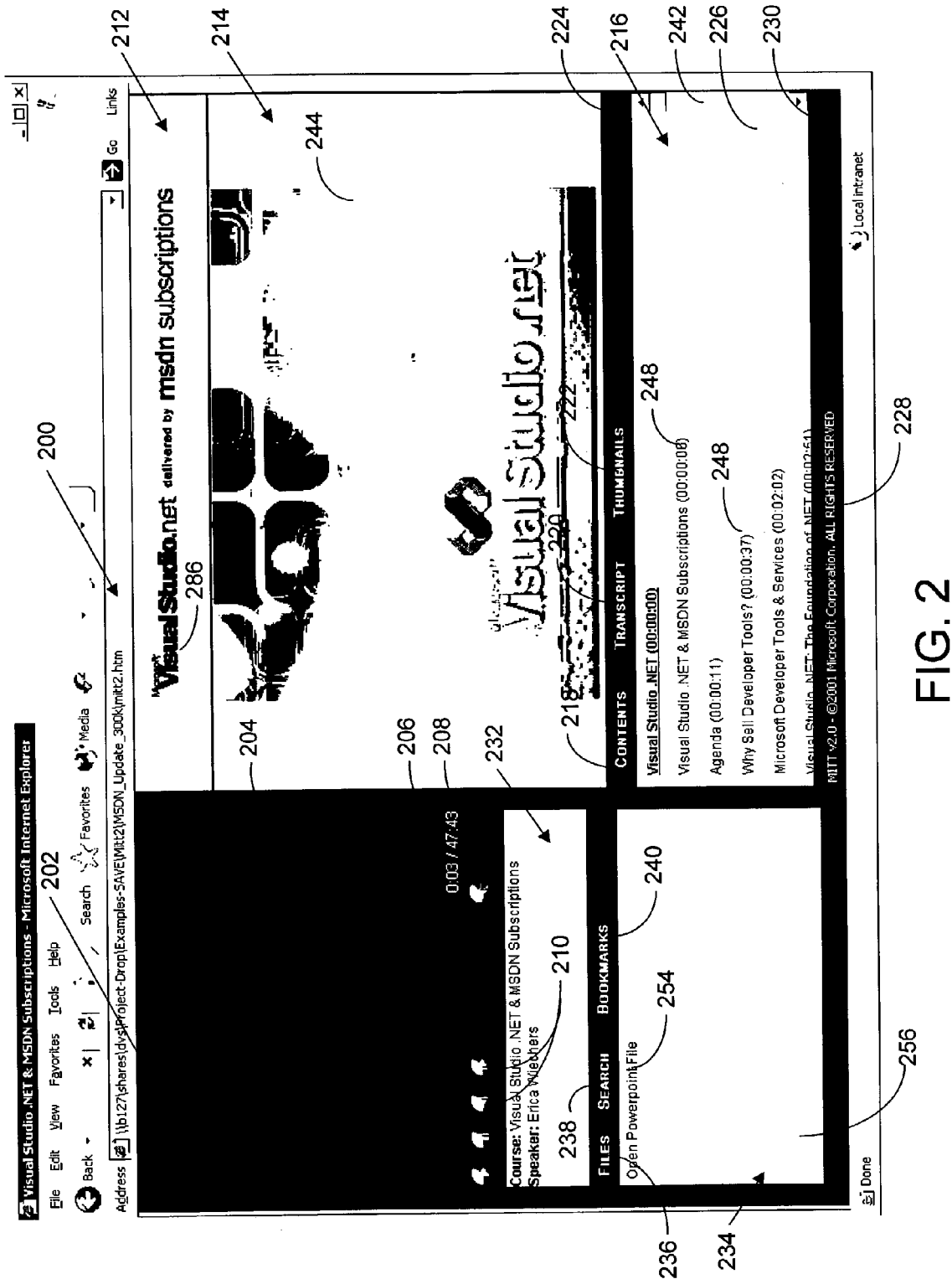
FIG. 2 shows a user interface window layout according to the present invention for a full-featured version of the presentation viewing system.

5 Referring to FIG. 2, the overall window layout of a full-featured version of the presentation viewing system is shown. This full version includes all the basic and optional sectors of the system window. In addition, the window depicted in FIG. 2 represents the default view that the viewer sees when the presentation viewing system is first activated.

In the upper left hand corner of the presentation viewing system window, there is a video sector 202, which includes a playback space 204 for displaying a video presentation, an elapse time/total time counter 206, and a video player controls area 208. The controls area includes a series of control icons 210 (which will hereafter be referred to as buttons) that are selectable by a viewer.

Any convention method of selection could be implemented in the presentation viewing system to allow the viewer to select functional features such as the video controls. In tested versions of the presentation viewing system, two modes of selection were implemented—namely standard single click and double click selection modes. For example, if the viewer is employing a conventional mouse or touch pad as an input device, the screen cursor would be moved as usual with the device and placed over the button whose function the viewer wants to activate. The viewer then "clicks" a selection button on the device either once or twice, as needed to activate the desired function. As the various interactive functions of the presentation viewing system are discussed in the sections to follow, it should be assumed that the first selection mode is used to activate a function, unless specified otherwise.

In the upper right hand corner of the presentation viewing system window, there is a banner sector 212, and just below it is a slide presentation sector 214 for displaying presentation slides associated with the video presentation. Just below the slide sector is a contents sector 216. The contents sector includes a set of buttons 218, 220, 222 labeled "Contents", "Transcript" and "Thumbnails" respectively. One or more resizing buttons 224 for changing the size of the contents sector in relation to the overall window are also included, as is a display space 226 located just below the buttons 219, 220, 222, 224. A small miscellaneous sector 228 is provided just below the contents sector at the bottom of the window. This sector can be used for displaying information that is not appropriate, or which would be distracting, to display elsewhere. For example, copyright information and a slide counter 230 can be displayed in this area, as it is in the example view shown in FIG. 2. On the left hand side of the window, just below the video sector 202, there is a presentation information sector 232, and just below that a links sector 234. The links sector 234 includes a set of buttons 236, 238, 240 labeled "Files", "Search" and "Bookmarks", respectively. The layout of all the foregoing sectors and their functionality will be described in more detail in the sections to follow.

It is noted that the contents, links, and possibly the presentation information sectors will at times need to relay more data to the viewer than can be displayed in the space available. When this situation occurs a provision for scrolling through the listed data in these sectors is provided. Any conventional scrolling method can be employed. In the tested versions of the presentation viewing system, a slider is provided for scrolling purposes. For example, such a slider 242, is provided to the right of the contents sector's display space 226 in the example view shown in FIG. 2. These sliders will be discussed in more detail in the sections to follow, as well.

The full-featured version of the presentation viewing system window described above can be reconfigured to include fewer of the identified sectors, if desired. In essence, the window could be pared down to just the video, slide presentation, and contents sectors—with the contents sector being limited to displaying just the contents topics associated with the aforementioned contents button (as will be described later). While it is believed a fuller version of the present system would be a more enriching experience for the viewer, a minimized version should still be very useful for educational and business presentations, and the like. An example of the above-described minimized version of the presentation viewing system window 300 is shown in FIG. 3, with the exception that a banner sector 302 is also included at the top left hand side of the window.

Figure 3:
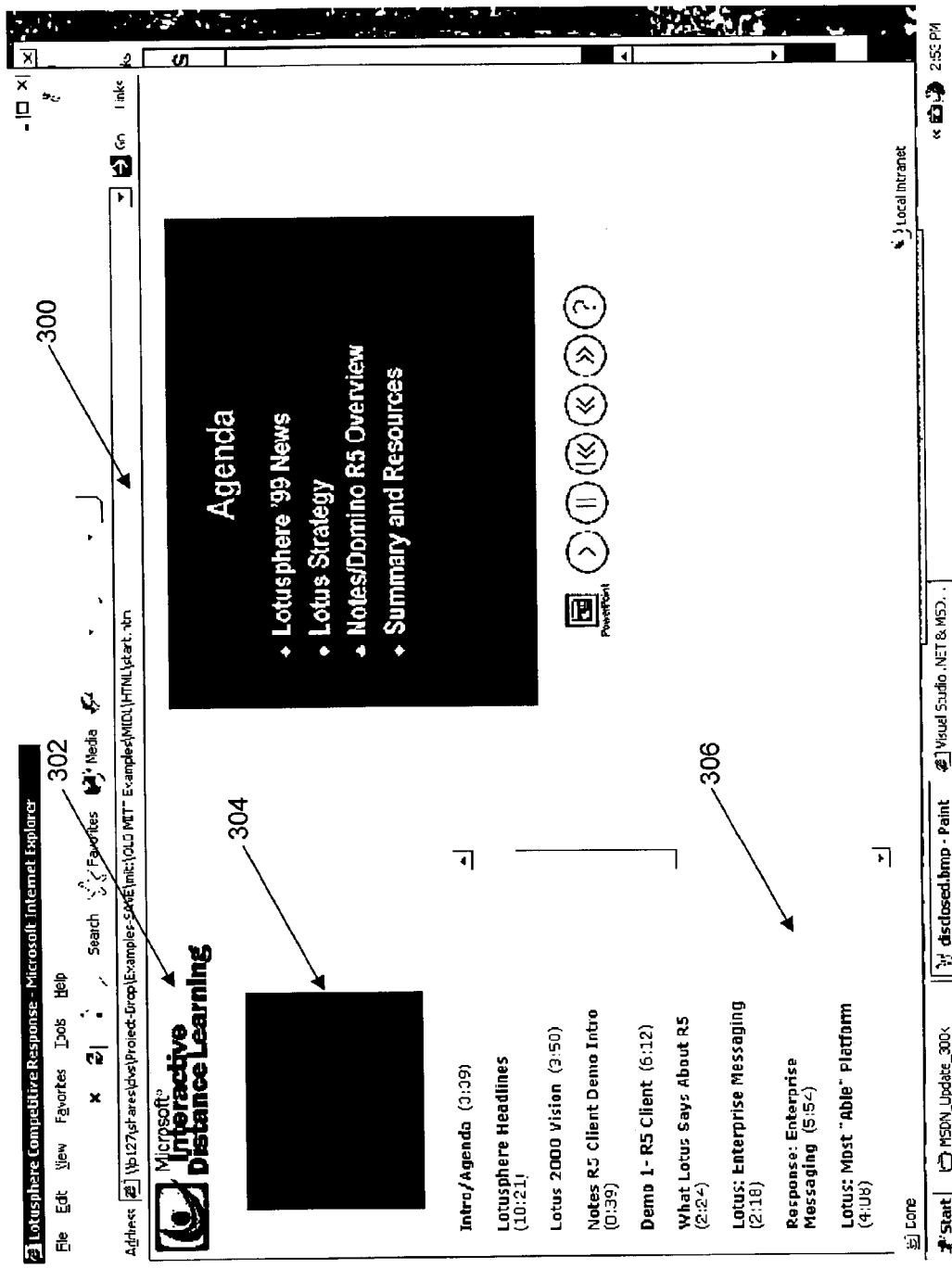
FIG. 3 shows a user interface window layout according to the present invention for a minimized version of the presentation viewing system.

FIG. 3 also illustrates that the location and the size of the individual sectors is not limited to the exemplary layout shown in FIG. 2. As can be seen in FIG. 3, the video sector 304 is smaller, and the banner 302 and contents sectors 306 are located differently, when compared to the layout shown in FIG. 2. In generally, the number, location and size of the various sectors can be varied as desired, without departing from the scope of the present invention.

Figure 4:
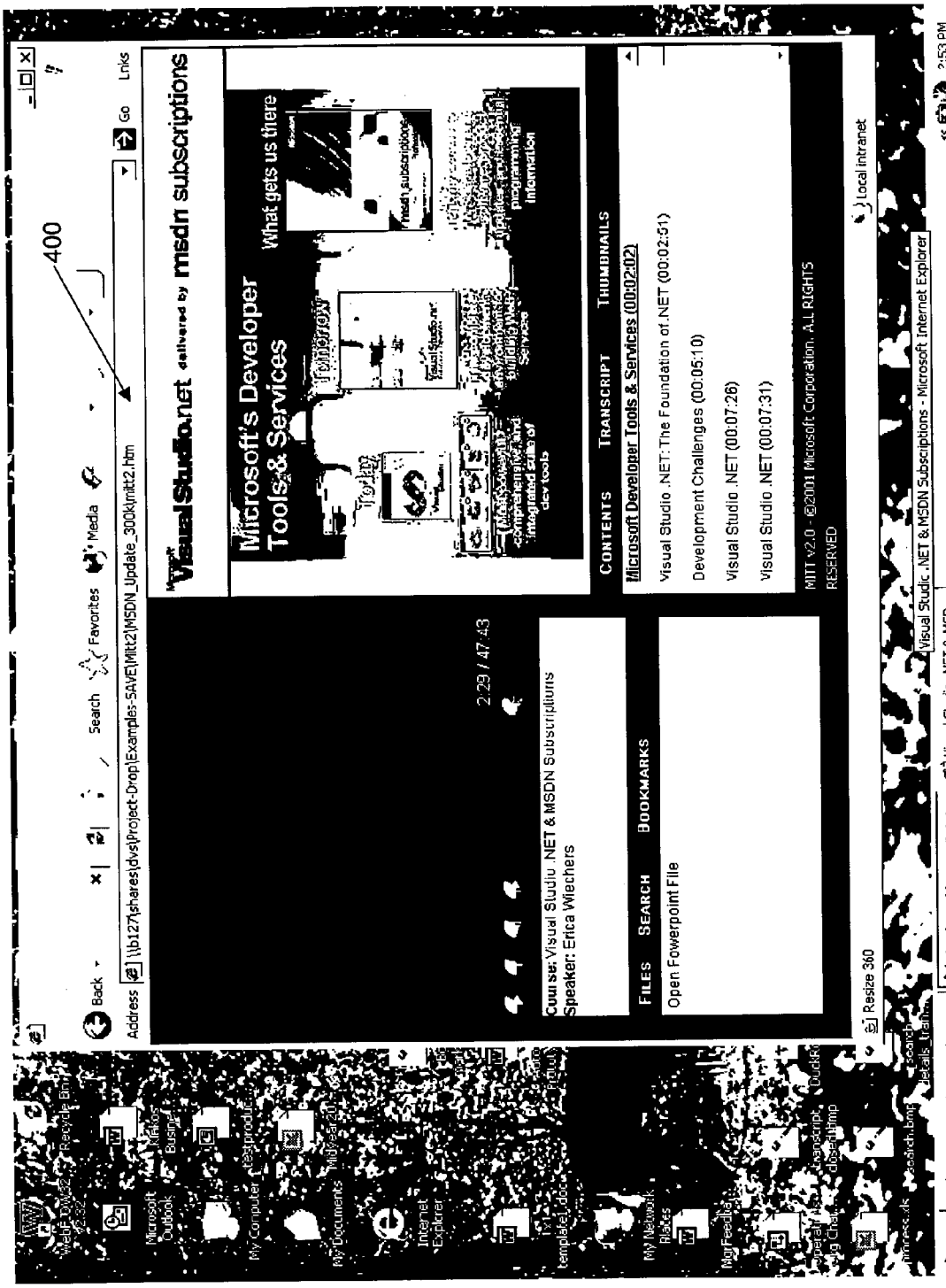
FIG. 4 shows a view of the presentation viewing system window of FIG. 1 that has been reduced in size where each sector is reduced proportionally, thus resulting in a smaller version of the window.

The presentation viewing system window is also scalable in that it can be varied in overall size. In one version of the present system, the scaling reduces the size of each included sector proportionally, thus resulting in a larger or smaller version of the same window, as depicted in FIG. 4. However, it is noted that some of the items displayed in the various sectors could become too small to be readily legible if the size of the window is reduced. To prevent this problem from occurring it is possible in an alternate version of the present system to establish minimum sector sizes and prioritize them. The sectors are then eliminated in order of importance as the overall size of the window is scaled down to the extent that one or more of the sectors would have to be shrunk beyond its assigned minimum size. For example, the full-up version of the presentation viewing system window could be reduced to the aforementioned minimized version, if the window is reduced to its minimum size. Only the highest priority sectors (i.e., the presentation video sector, the presentation slide sector and the contents sector) would remain in the minimized version. The location of the remaining sectors could also be changed to minimize any unused space in the viewing window and to facilitate the legibility of the scaled down sectors by making them as big as the space available will allow.

The presentation viewing system also has another unique feature related to any resizing of the slide presentation sector. Specifically, the resolution of the presentation slide displayed in the slide sector 214, is maintained regardless of the size of the sector. This feature will be discussed in greater detail later.

2.0 The Video Sector

The video sector is generally used to display the playback of the video presentation, as described previously. More particularly, referring to FIG. 2, when the video is running, it is displayed in a playback space 204. In tested versions of the present system, the maximum resolution of the video was 320×240.

The video sector also includes the aforementioned buttons 210 for controlling the playback of the video presentation. While the number of control buttons can vary, they preferably at least include buttons for playing, pausing, "rewinding", and "advancing" the video. Other buttons to control features such as muting the audio playback, returning to the beginning of the video, and the like, or even a link to a help feature associated with the video player program being employed can be included as well. The viewer selects the control functions by selecting the appropriate button.

In addition to the video player control buttons, the video sector can also include the aforementioned counter 206 showing both elapsed time from the beginning of the video presentation and the total running time of the video. For example, in tested versions of the presentation viewing system, this counter took the form of "XX:XX/XX:XX", where the numbers before the slash represent the minutes and seconds respectively of the elapsed time, and the number to the right of the slash represent the minutes and seconds of the total running time.

It is noted that the video could include an area showing a person signing for deaf viewers or some graphical representation thereof. In addition, the video could be replaced with an audio only lecture, in which case the controls buttons would control the playback of the audio. In the case of an audio program, the playback space of the preview sector could be left blank (typically all black), or a predetermined visual frame or effect could be employed. For example, the playback space could display an image reading "Audio Only" throughout the playback of the program. Alternatively, a prescribed animation sequence could be presented in the playback space during the playback of an audio program.

3.0 The Presentation Information Sector

The presentation information sector displays information pertaining to the particular presentation being played. This information can be anything that would be useful for the viewer to know about the presentation. For example, referring to FIG. 2 once again, the presentation information sector 232 can include the title of the course or subject of the presentation, and the name of the speaker in the video (as was the case in the tested versions of the system).

4.0 The Slide Presentation Sector

Figure 7:
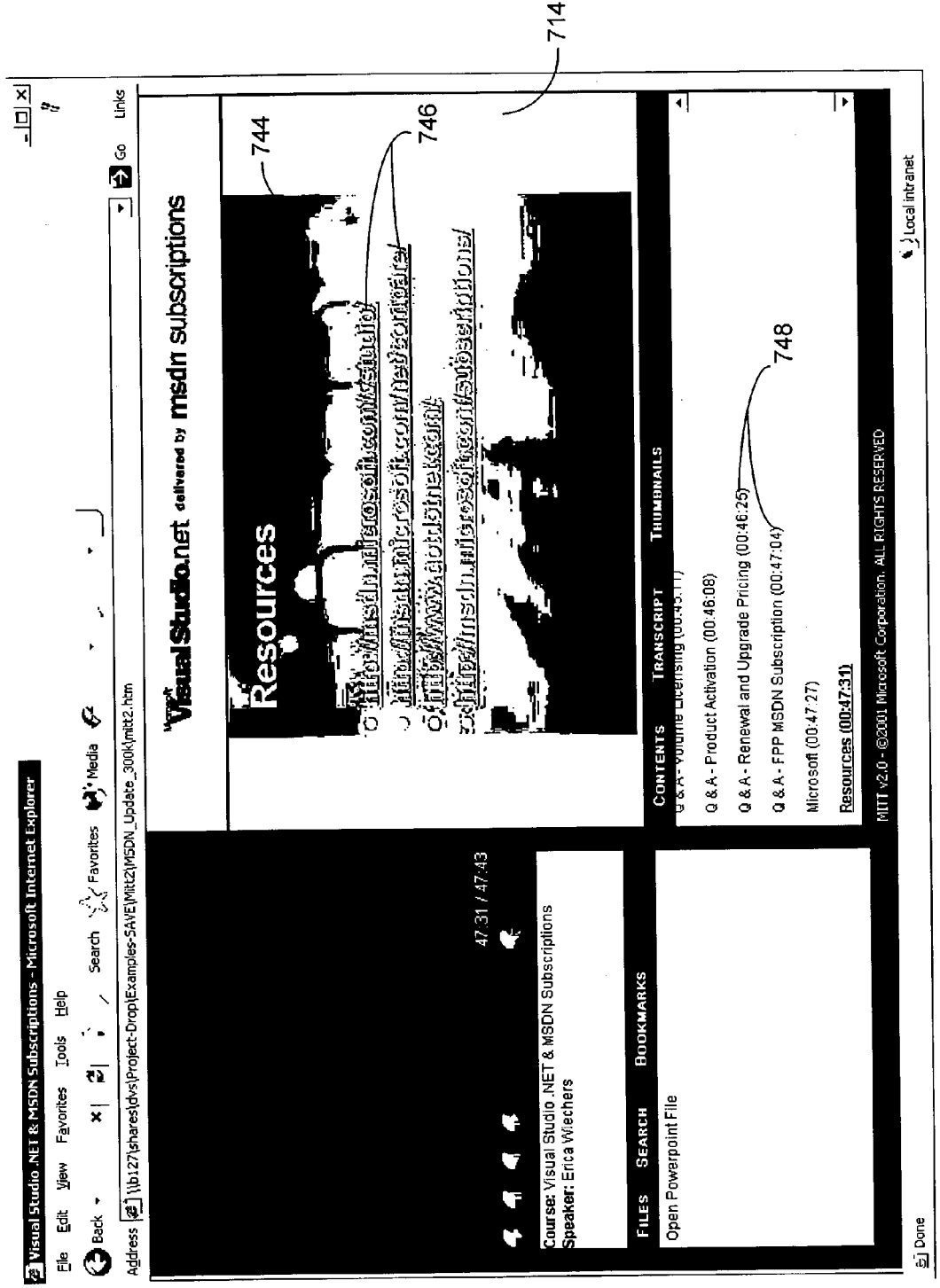
FIG. 7 shows a view of the presentation viewing system window of FIG. 1 where active "hot links" are displayed in the presentation slide sector and subject matter topics are listed in the content sector.

The slide presentation sector is essentially a viewing space for displaying presentation slides associated with the video, as discussed previously. The slides will typically pertain to the discussion presented in the video and change as the video presentation plays. The video presentation may even refer to the displayed slide. The presentation slides are created for the present system using any appropriate presentation graphics program, such as Microsoft Corporation's PowerPoint®. The slides can include any of the functional and interactive features that the presentation program is able to provide. For example, the slides displayed in the viewing space can exhibit animations, include embedded images, or the like. In addition, as depicted in FIG. 7, a presentation slide 744 displayed in the slide presentation sector 714 can have active "hot links" 746 that when selected (e.g., by double clicking) connect to outside files, programs, Internet or intranet sites, or any other linkable item.

Figure 5:
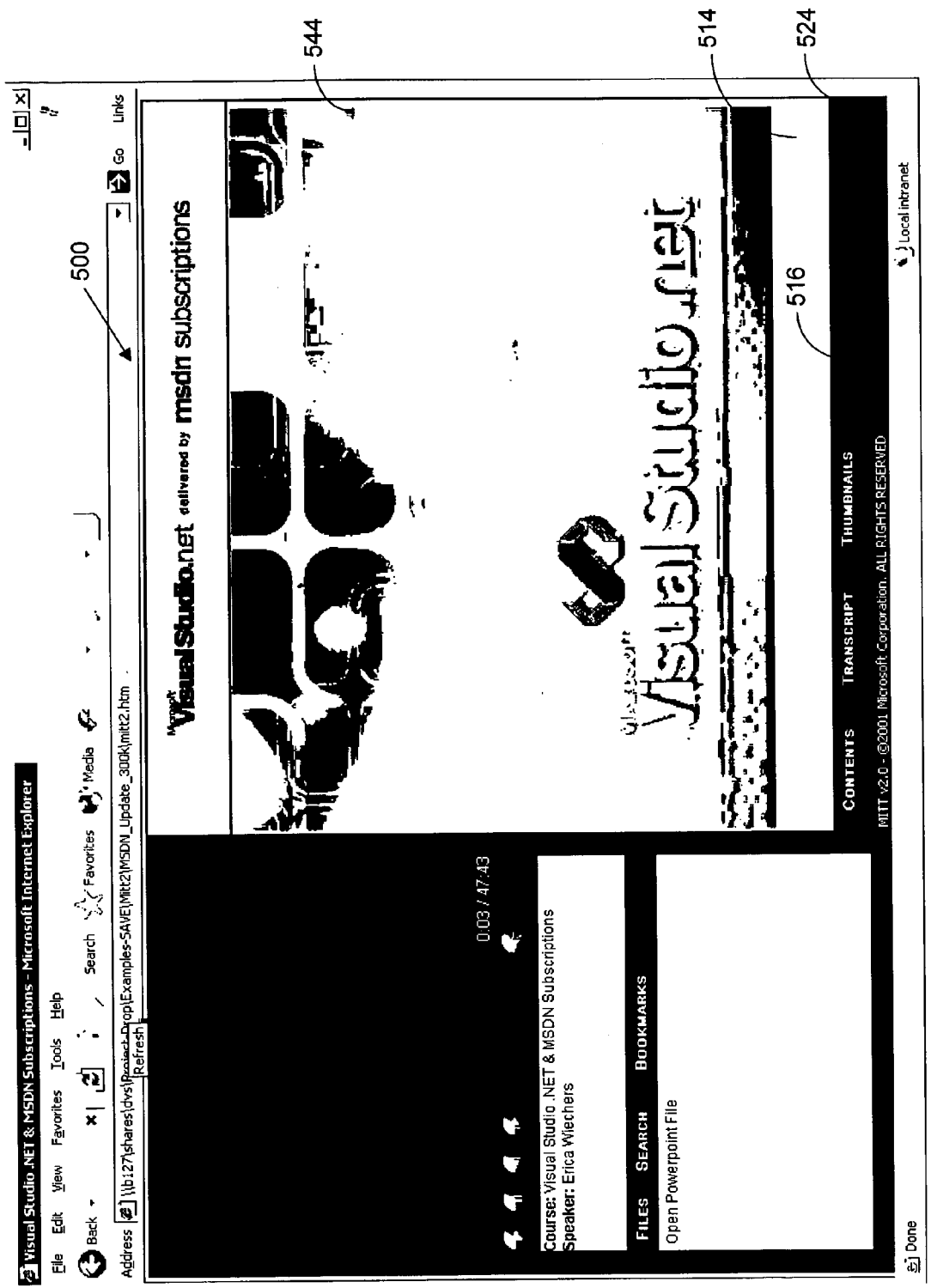
FIG. 5 shows a view of the presentation viewing system window of FIG. 1 where the slide presentation sector has been increased in size within the window itself.
Figure 6:
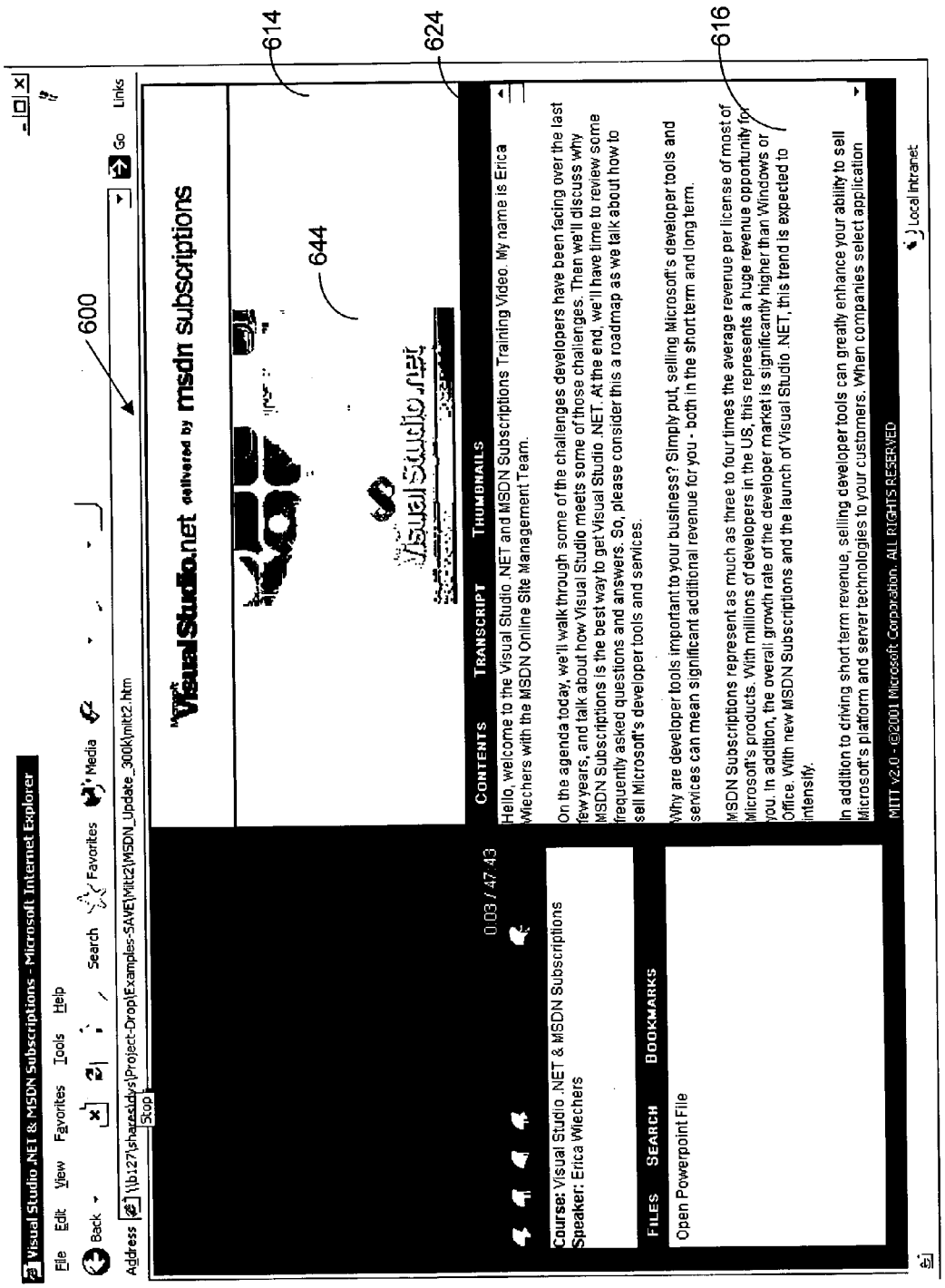
FIG. 6 shows a view of the presentation viewing system window of FIG. 1 where the slide presentation sector has been decreased in size within the window itself.

As mentioned previously, the presentation slides exhibit a high resolution and have a unique feature of retaining their resolution regardless of the size of the slide presentation sector, thereby retaining their readability. Accordingly, if the entire presentation viewing system window is upsized or downsized, the resolution of the displayed presentation slide remains the same. An example of this scenario is shown in FIG. 4, where the window 400 has been downsized. Likewise, if the size of the presentation sector is enlarged or reduced internally within the window (as will be described later), the resolution and readability of the displayed slides remains constant. An example of the slide presentation sector 514 being increased in size within the window 500 itself is shown in FIG. 5. An example of the slide presentation sector 614 being decreased in size within the window 600 is shown in FIG. 6.

A presentation slide counter is also provided in the presentation viewing system window, either adjacent to the slide sector or as in tested versions of the system in a remote location where it is less distracting. In tested versions of the present system, this slide counter 230 took the form of "SLIDE XX OF XX", where the first number refers to the sequence number of the presentation slide then displayed in the slide presentation sector and the second number refers to the total number of slides in the presentation, as shown in FIG. 2.

5.0 The Content Sector

The contents sector includes three buttons and a display space, as discussed previously. Referring to FIG. 2 once again, the three buttons are the contents button 218, the transcript button 220 and the thumbnails button 222. Each button 218, 220, 222 activates a different content option and results in something different being displayed in the display space 226. In general, each option relates to a way of following and affecting the progress of the video presentation.

The contents sector is resizable using the aforementioned resizing buttons 224. When the presentation viewing system window is initially opened, the contents sector 216 has an intermediate or nominal size, as shown in FIG. 2. In this mode, there is a resizing button for increasing the size of the display space, and a resizing button for closing the display space. When the display space of the contents sector 616 is enlarged, its vertical height is increased, as shown in FIG. 6. As a result, the adjacent sector (which in the case of the tested, full-featured versions of the system was the presentation slide sector 614) above or below the contents sector is reduced in size vertically. In the case of the presentation slide sector 614, this reduction in size causes the size of the displayed slide 644 to decrease, similar to when the overall size of the presentation viewing system window is reduced. Conversely, referring now to FIG. 5, when the display space of the contents sector 516 is closed, the adjacent sector is increased in size, and in the case of the slide sector 514, the overall size of the displayed slide 544 is increased. As indicated previously, this increase in the size of the slide is done without loss of resolution. Thus, the slide remains very readable.

When the display space of the contents sector is in its enlarged mode, a resizing button 624 is displayed to reduce the space back to its nominal size, as shown in FIG. 6. Similarly, when the display space 516 of the contents sector is closed, a resizing button 524 is displayed to return the space back to its nominal size, as shown in FIG. 5.

5.1 Contents Option

Referring again to FIG. 2, the contents option is activated when a viewer first opens the presentation viewing system, or when the viewer selects the contents button 218. Upon its selection the contents option causes a list of topics 248 to be displayed in the display space 226. Each topic 248 in the list corresponds to a separate section of the video presentation and has a short title representative of subject matter of that section. In addition, a duration time is appended to each topic, which indicates the length of that portion of the video. Initially, when the contents option is activated, the topic 248 then being covered in the video presentation is highlighted (e.g., by showing it in a different color, font, size, or in some visibly apparent way made different from the rest of the listed items) and displayed at the top of the topic list in the display space 226, as shown in FIG. 2. Listed below in the order in which they are covered in the video presentation are other topics 248. As the video presentation proceeds and moves on to a new topic, the list automatically scrolls such that the new topic is highlighted in lieu of the just-completed topic, and moved up to the top of the list.

It is noted that not all the topics associated with the video presentation may be able to be displayed in the room available in the display space. However, the viewer can manually scroll through the topics list, moving up or down as desired, to display whatever topic in the list the viewer desires. In the tested versions of the present system, this scrolling can be performed using a slider 242 that is displayed to the side of the display space 226, as shown in FIG. 2. However, any other conventional scrolling method could alternately be made available for this purpose, such as using the arrow keys on a keyboard. It is further noted that the previously described enlarged mode of the display space can be useful in that the added room is used to display more of the contents topics.

The viewer can also manually select any of the topics listed in the display space. Upon selection of a topic, that topic 748 becomes highlighted in the list, and the video begins playing at the beginning of the portion of the presentation covering the selected topic, as best shown in FIG. 7. In addition, the presentation slide 744 corresponding to that portion of the video is displayed in the slide sector 714.

As is evident from the foregoing description, the video presentation is segmented into a sequential list of content topics. This segmentation can manifest itself in a variety of ways. One of the simplest segmentation schemes involves using the presentations slides as a dividing line. Thus, a separate topic is created for each presentation slide and refers to the portion of the video associated with that slide. This scheme can have the added advantage of using the presentation slide titles (if available) as the text for the content topic. However, the present system is not limited to a one-topic-per-slide scheme. Rather any division can be made and any word or phrase can be used as the text for the topics. For example, a particular subject discussed in a video presentation might involve the use of multiple slides. In such a case it might be more appropriate to have just one content topic to refer to the entire discussion. Thus, when the content topic is selected, the first of the applicable slides would be displayed in the presentation slide sector, and the video would begin to play at the point where the discussion of the selected topic begins. As the video proceeds, the slides would change but the content topic line would not. Another example of an alternate segmentation scheme involves the situation where the video might discuss multiple subjects, but refer to only one slide. In such a case, it might be desirable to have a separate content topic for each of the subject. Thus, when the first of these content topics is selected, the video will begin playing at the point where that topic begins and the slide covering all the aforementioned topics is displayed in the presentation slide sector. As the video plays, the content topic line will changes, but the same slide will be displayed throughout.

The contents topic list can also include a demonstration or "demo" link. The demo link is listed as a topic in the topics list and given any appropriate name—preferably one including an indication that the topic is a link to an outside video presentation. When the video playing in the presentation viewing system window reaches the point in the presentation corresponding to the demo link, or if the viewer selects the link in the contents list, the video is paused and the associated link to the outside video is opened up. Specifically, the demo link links to an outside video player program that automatically plays a video in a separate window on the screen. The demo video window preferably includes video controls similar to those included in the video sector of the presentation viewing system window. Once the outside video demo is finished playing or the viewer closes it, the presentation viewing system window automatically comes back into the forefront of the screen and the main video presentation resumes playing where it left off with the next topic in the content topic list.

5.2 Transcript Option

Figure 8:
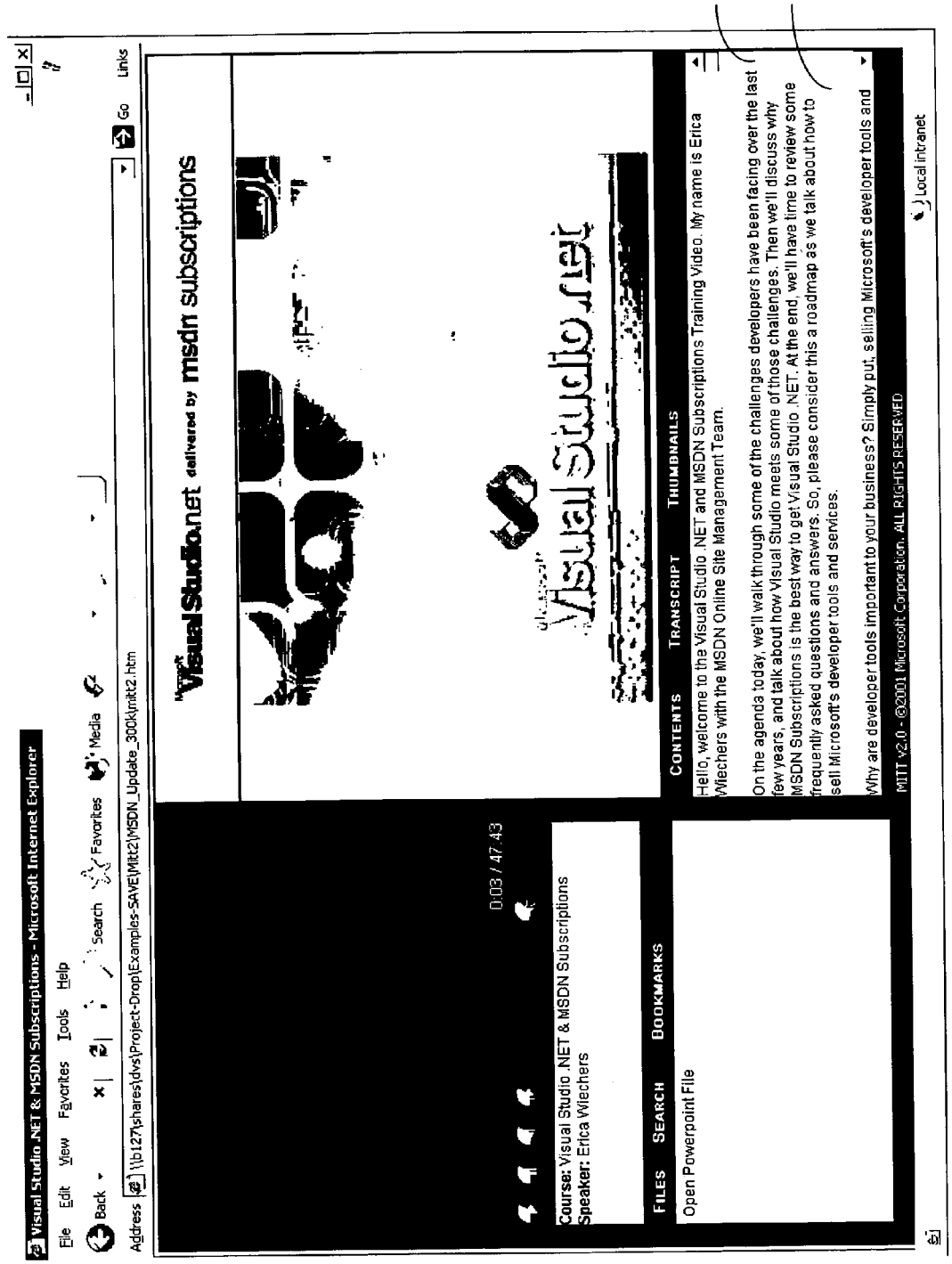
FIG. 8 shows a view of the presentation viewing system window of FIG. 1 where transcript segments are listed in the content sector.

Referring now to FIG. 8, the transcript option is activated when a viewer selects the transcript button 820. Upon its selection the transcript option causes a transcript of the audio track of the video presentation to be displayed in the display space 826. Specifically, as much of the transcript that includes the portion corresponding to the part of the audio track currently playing, and that can fit into the display space 826, is shown. Thus, if the display space is in its enlarged mode, more of the transcript can be displayed (as shown in FIG. 6).

The portion of the transcript corresponding to the part of the audio track currently playing is highlighted. This displayed and highlighted portion has a prescribed length referred to as a transcript unit. This transcript unit can be any length desired, such as a phrase, a sentence or set number of sentences, a paragraph or set number of paragraphs, or an entire section. In tested versions of the present system, the transcript unit was a paragraph in length. The transcript units are preferably separated from each other in the display space 826, so the viewer can readily distinguish between the units. For example, each unit could be separated by starting it on a new line or by including a blank line between the units. The highlighted transcript unit is normally displayed at the top of the display space 826 with the subsequently occurring units listed below it. As the video plays, the transcript scrolls down in the display space with each new prescribed portion (i.e., transcript unit) being highlighted when the audio track reaches it and moved to the top of the displayed list.

The viewer can also manually scroll up and down through the transcript. To this end, a slider 842 is provided at the side of the display space 826, as shown in FIG. 8, for this purpose, in tested versions of the present system. However, other scrolling techniques could be employed instead. The viewer can also select individual transcript units of the transcript that are displayed in the display space. When a viewer selects a part of the transcript that is not currently being played in the video, the video restarts at the point corresponding to the beginning of the selected transcript unit. In addition, the presentation slide associated with the section of the video being played is displayed in the slide sector.

The transcript need not be in the same language as the audio track of the video. Thus, the transcript can act as translation of the video, akin to subtitles used in traditional movies. The transcript also need not be verbatim, and could include annotations and modifications to what is said on the video's audio track. The transcript could even be a series of signing symbols for the deaf.

5.3 Thumbnails Option

Figure 9:
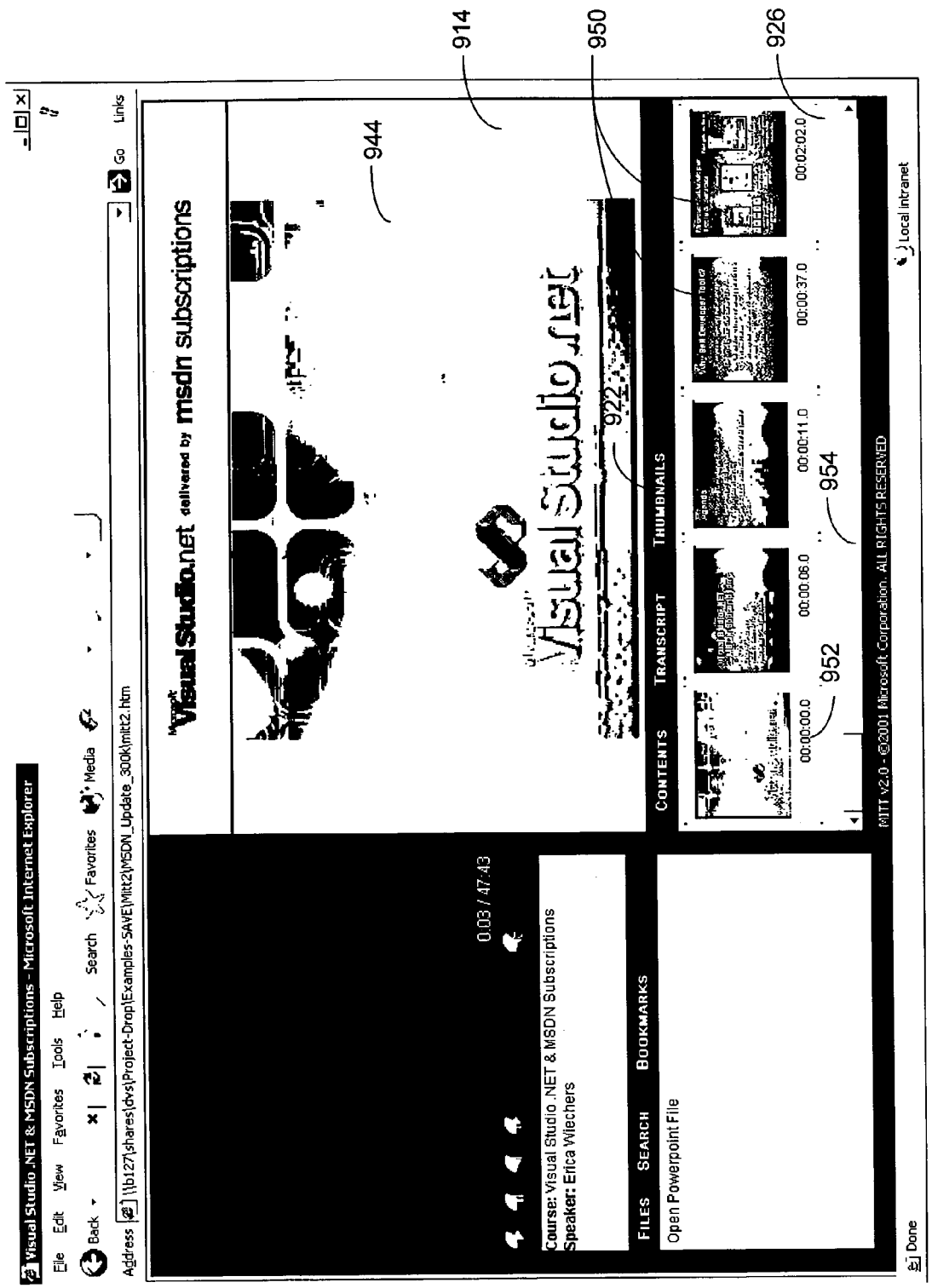
FIG. 9 shows a view of the presentation viewing system window of FIG. 1 where thumbnail images of the presentation slides are displayed in the content sector.

The thumbnails option is activated when a viewer selects the thumbnails button 922, as shown in FIG. 9. Upon its selection the thumbnails option causes thumbnail versions 950 of the presentation slides 944 to appear in the display space 926. Appended to each thumbnail 950 (e.g., at the bottom as in the tested versions of the present system) is a time indicator 952 specifying the elapse time of the video where the discussion of the presentation slide represented by the thumbnail begins. The thumbnails 950 are shown in sequence from left to right in the display space 926, and can be wrapped around in one or more rows depending on the size of the space. Thus, more thumbnails would be displayed when the display space is in its enlarged mode. The thumbnail 950 representing the presentation slide 944 that is currently displayed in the presentation slide sector 914 and associated with the portion of the video currently being played, is initially displayed in leftmost position in the top row thumbnails (i.e., the first thumbnail position). This thumbnail 950 is also highlighted to indicate it represents the currently displayed presentation slide 944. As the video plays and the next presentation slide is displayed in the slide sector, the thumbnail representing this slide is highlighted and moved into the first thumbnail position. The rest of the thumbnails move up one position, with the thumbnail representing the previously displayed slide being removed, and the last position being filled with a new thumbnail representing the last slide in the displayed thumbnail sequence (if any).

The viewer can also scroll forwards and backwards through thumbnails sequence. When the viewer scrolls past the first position in the display space, new thumbnails appear representing presentations slide coming earlier in the sequence (up to the first slide), and thumbnails at the end of the displayed portion of the sequence disappear from view. Likewise, when the viewer scrolls past the last position in the display space, new thumbnails appear representing presentations slide coming later in the sequence (down to the last slide), and thumbnails at the front of the displayed portion of the sequence that occupy the first position in the display space disappear from view. In tested versions of the presentation viewing system, a slider 954 is provided for this purpose, as shown in FIG. 9. This slider 954 is provided at the bottom of the display space 926. However, it could just as well be at the top, and other scrolling techniques could be employed instead. The viewer can select any thumbnail in the display space, using one of two modes. When a viewer selects a thumbnail using the first selection mode (e.g., single click), it is highlighted and the presentation slide represented by the selected thumbnail is displayed in the presentation slide sector, even if it is not the slide currently being discussed in the video. If the viewer selects a displayed thumbnail using the second selection mode (e.g., double click), the selected thumbnail is highlighted and the presentation slide represented by the selected thumbnail is displayed in the presentation slide sector as before, but this time the video restarts at the point corresponding to the beginning of the discussion of the displayed presentation slide.

6.0 The Links Sector

Referring again to FIG. 2, the links sector 234 is a multi-purpose, interactive region that includes buttons 236, 238, 240 for selecting a Files, Search or Bookmarks option, respectively. Each of these options brings up a list of links to portions of the video presentation or outside programs, files, Internet or intranet sites, and the like.

6.1 Files Option

The Files option, when activated, provides a list of links 254 that are displayed in the display area 256 of the links sector, as shown in FIG. 2. The links 254 can generally be to any number of things, such as data, image or video files in any number of other programs, Internet or intranet sites, other programs, and the like. In addition, the links 254 could be specific to the currently displayed presentation slide or the current video presentation topic, or they could pertain to the presentation as a whole. If they are slide/topic specific, then the links 254 would change as each new slide or topic is reached in the video presentation.

In operation, the viewer selects the Files button 236, and a list of all available links 254 are displayed in the display area 256 of the sector 234. A viewer selects any of the links and the selected link is opened. The file, program, site, etc. associated with the link will typically be viewed in a separate window overlying the presentation viewing system window. The viewer can then use the link as desired, and upon closing it is returned to the presentation viewing system window.

6.2 Search Option

Figure 10:
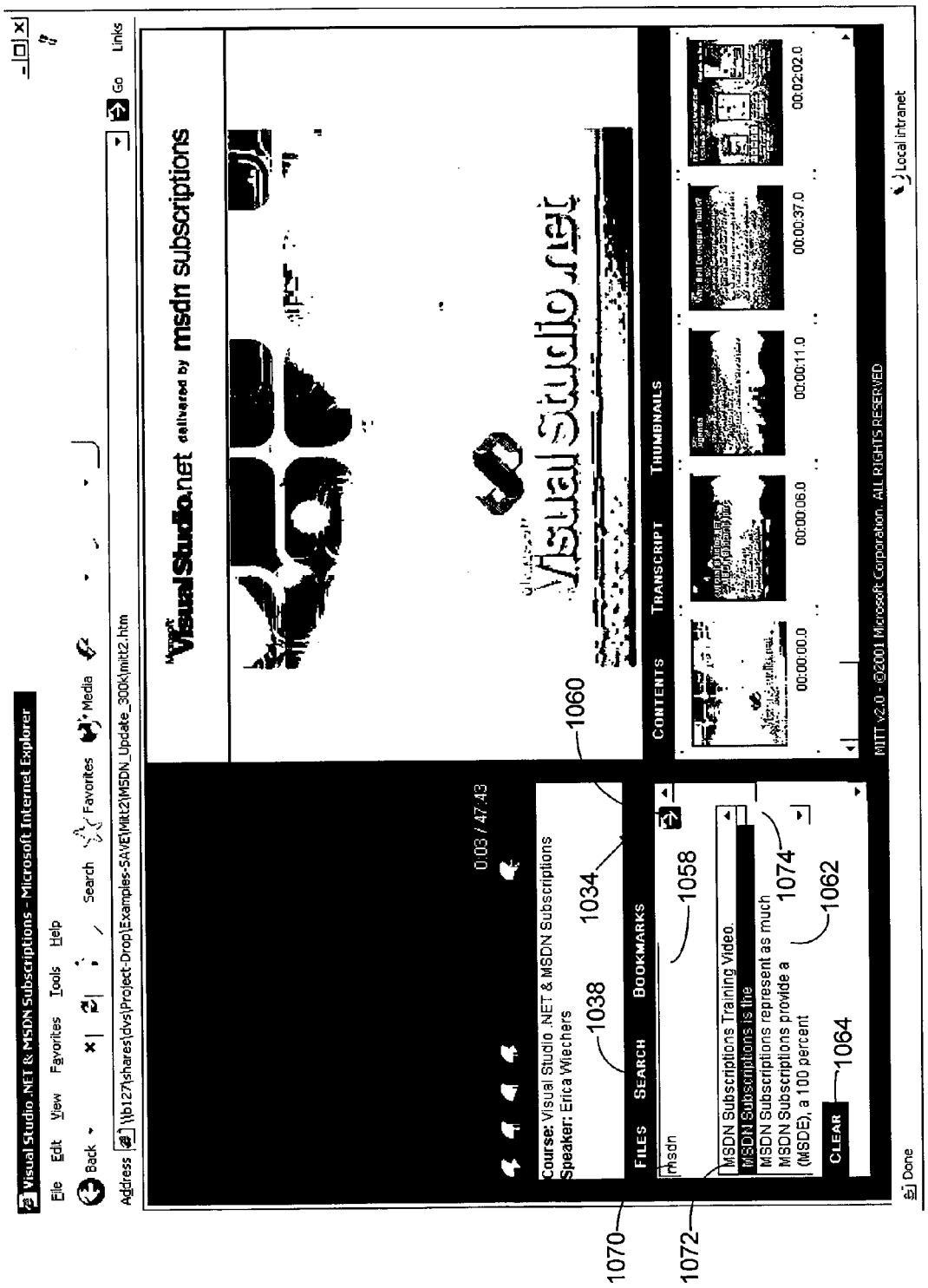
FIG. 10 shows a view of the presentation viewing system window of FIG. 1 where a search option has been activated and search request and results spaces are displayed in the display area of the links sector.
Figure 11:
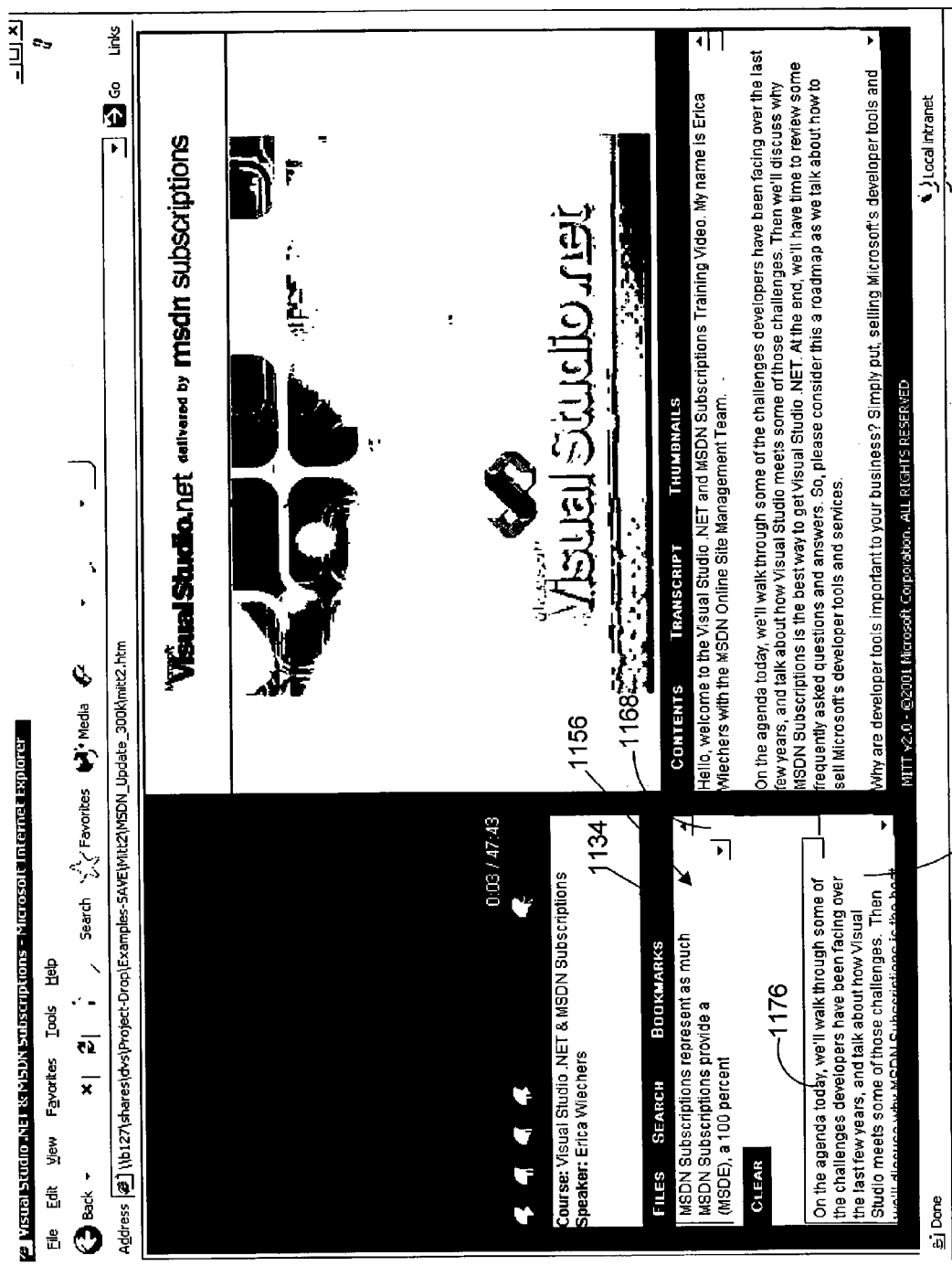
FIG. 11 shows a view of the presentation viewing system window of FIG. 1 where the display area of the links sector has been scrolled with the search option activated to display the search details space.

Referring to FIG. 10, the search option, when activated, displays a search request space 1058 and a search request button 1060, as well as a search results space 1062 in the aforementioned display area of the links sector 1034. In addition, a "Clear" button 1064 is displayed. And finally, space permitting, a search details space is displayed (not shown in FIG. 10). Referring now to FIG. 11, if there is not enough space in the links sector 1134 to initially display the search details space 1166, then it can be found by scrolling down. In the case of tested versions of the present system, a slider 1168 is provided at the side of the display area 1156 for the purpose of scrolling.

Referring again to FIG. 10, in operation, a viewer selects the search button 1038 at which point the above-described search spaces are displayed in the display area 1034. The viewer then enters a search request 1070 in the request space 1058, which in the case of tested versions of the present system were keywords. Of course, other search engines can be employed instead and requests need not be keyword based. As the viewer enters each letter, number or symbol of the search request 1070, the closest fitting search subjects 1072 known to the system are displayed in the search results space 1062. In tested versions of the presentation viewing system, the keywords represented actual text from the transcript of the video being played, and the search subjects where short phrases parsed from the transcript that begin with the keyword. In such a case, the search option would be available only when the present system includes the aforementioned transcript option. The search results space 1062 is typically large enough, depending on the window scaling, to display several search subjects 1072 containing the text or symbols entered by the viewer. Once the keyword is entered, the viewer sees a list of phrases beginning with the keyword entered (or one close to the keyword entered). The viewer then selects one of the listed search subjects 1072. It is noted that the list of phrases containing the keyword may exceed the space available to display them in the search results space 1062. If so, the viewer can scroll through the list. To this end, in tested versions of the present system, a slider 1074 is provided to the side of the search results space 1062 for scrolling purposes.

The selection procedure has two modes (e.g., single and double click). In the first mode (e.g., single click), selecting a search subject causes additional information 1176 about the subject to be displayed in the search details space 1166, as shown in FIG. 11. In tested versions of the presentation viewing system, the details displayed correspond to the previously described transcript unit associated with the selected phrase in the transcript containing the keyword. In addition, the selected search subject is highlighted. If the second selection mode is enacted (e.g., double click), the selected search subject is still highlighted, but in this case a global reset is performed where the video is restarted at the point corresponding to the transcript unit containing the selected search subject. In addition, the presentation slide associated with the part of the video now being played is displayed in the slide presentation sector. Further, depending on whether the contents, transcript or thumbnail option is selected, the contents sector displays the item corresponding to the part of the video being played. For example, if the contents option is active, the contents topic, as well as other topics coming thereafter space permitting, are displayed in the display area of the contents sector. Whereas, if the transcript option is active, the particular transcript unit containing the selected search subject is displayed, as well as other adjacent transcript units as space permits. And finally, if the thumbnail option is active, the thumbnail corresponding to the newly displayed presentation slide is displayed, along with those slide thumbnails following it that will fit in the display area of the contents section.

The viewer can also select the aforementioned clear button at any point in the search process after having entered all or part of a search request. When the clear button is activated, all the search spaces are cleared, and are ready for a new request.

6.3 Bookmarks Option

Figure 12:
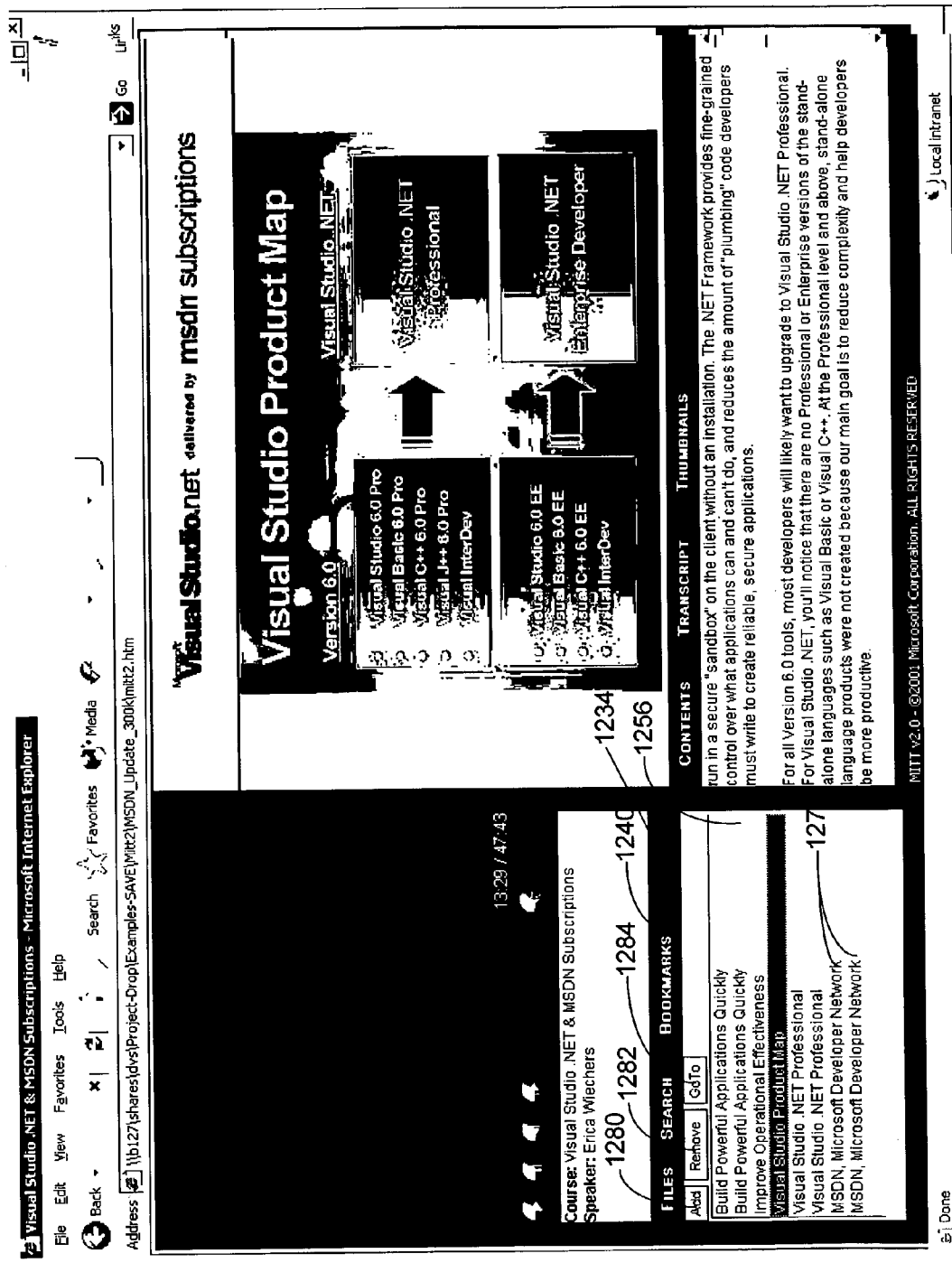
FIG. 12 shows a view of the presentation viewing system window of FIG. 1 where a bookmarking option has been activated and a list of bookmark links created by the user is displayed in the display area of the links sector.

The bookmarks option, when activated, allows a viewer to make a list of parts of the video presentation that the viewer would like ready access to in the future (i.e., bookmarking portions of the video). Referring to FIG. 12, in tested versions of the presentation viewing system, the bookmark list created by the viewer is a list of content topics 1278 corresponding to the portions of the video presentation concerning the topics.

In operation, the viewer selects the bookmarks button 1240. This results in three buttons being displayed in the links sector 1234—namely, add, remove and "goto" buttons 1280, 1282,1284. In addition, a bookmarks space 1256 is displayed. The bookmarks space 1256 is blank if the viewer has not previously created any bookmarks. However, if the viewer has created bookmarks, they are listed in the bookmarks space 1256 (as shown in FIG. 12).

The viewer selects the add 1280 button to create a bookmark. Upon selection of the add button 1280, a bookmark link 1278 representing a link to the portion of the video then being played is listed in the bookmarks space. In tested versions of the present system, this bookmark link 1278 was the content topic corresponding to the portion of the video being played when the viewer selected the add button 1280. Any number of bookmarks can be created in this manner. If the list becomes to long to be displayed in its entirety in the bookmarks space 1256, the viewer can scroll through the list to bring a desired bookmark into view. To this end, a slider (not shown) can be included at the side of the bookmarks space.

A bookmark remains in the bookmarks list until the viewer manually removes it. This removal entails selecting the bookmark 1278 that is to be removed in the bookmarks space 1256 using the first of two selection modes. In this first selection mode (e.g., single click), the chosen content topic is highlighted in the bookmarks list. The viewer can then select the remove button 1282, which results in the highlighted topic being deleted from the list in the bookmarks space 1256.

The viewer can also elect to go to the bookmarked portion of the video presentation. This can be accomplished in two different ways. The viewer can highlight the desired bookmark 1278 using the aforementioned first selection mode, and then select the goto button 1284. Alternately, the viewer can select the desired bookmarks 1278 using the second selection mode (e.g., double click). The result of either selection method is the same, a global reset is performed as described previously, except in this case the video is restarted at the point corresponding to the beginning of the content topic associated with the selected bookmark.

7.0 The Banner Sector

Referring again to FIG. 2, the banner sector 212 is employed to display a logo or banner 286. Typically, the information displayed in the banner sector 212 would relate to the subject of the presentation provided by the presentation viewing system. However, this need not always be the case. Any desired information could appear in the banner sector 212. For example, a company logo, project name, or even a slogan could be displayed. It is also noted that the information displayed can be in the form of text or graphics, or a combination of both.

Wherefore, what is claimed is:

1. An interactive, multi-media presentation viewing system, comprising:
   a general purpose computing device comprising a display, user interface selection device and user interface data entry device; and
   a computer program comprising program modules executable by the computing device, wherein the computing device is directed by the program modules of the computer program to display a presentation viewing system window on the display comprising a plurality of sectors comprising,
      a presentation video sector which plays a video, audio, or audio and video program (collectively referred to hereinafter as the A/V program) associated with the presentation,
      a presentation slide sector which displays presentation slides, each of which is associated with a different portion of the presentation, the presentation slide sector automatically displays the particular slide that is scheduled to be shown when the A/V program reaches a prescribed elapsed running time, unless a contrary user-generated control instruction directs otherwise, and
      a content sector which in a first mode comprises a display of a list of subject matter topics each of which is associated with a different portion of the presentation; and wherein
   said content sector is employed by a user using said selection and data entry devices to control the playing of the A/V program and the display of presentation slides, wherein upon selecting one of said subject matter topics by the user,
      the A/V program being played in the presentation video sector is caused to start playing at a point corresponding to the elapsed running time assigned to the selected topic, and
      the slide that is scheduled to be shown when the A/V program is at the point corresponding to the elapsed running time assigned to the selected topic is caused to be displayed in the presentation slide sector; and wherein
   displaying the first mode of the content sector, further comprises displaying one or more links to A/V programs, other than the A/V program being played in the presentation video sector, within the list of subject matter topics, each link being assigned an elapsed running time of the A/V program; and whenever the A/V program playing in the presentation video sector reaches the elapsed running time assigned to a link, pausing the A/V program playing in the presentation video sector, opening a demonstration window and playing the A/V program associated with a link in the demonstration window, and closing the demonstration window and starting the previously paused A/V program playing in the presentation video sector when the A/V program associated with a link is finished playing.

2. The system of claim 1, wherein each of said subject matter topics is assigned an elapsed running time of the A/V program that corresponds to the beginning of a portion of the A/V program related to the particular subject matter topic, and wherein the program module for displaying the first mode of the content sector, comprises a sub-module for automatically highlighting the topic associated the portion of the A/V program then being played in the presentation video sector as indicated by the elapsed running time assigned to the topic, unless a contrary user-generated control instruction directs otherwise.

3. The system of claim 2, wherein the program module for displaying the first mode of the content sector, further comprises a sub-module for automatically displaying the topic associated with the portion of the A/V program then being played in the presentation video sector, as indicated by the elapsed running time assigned to the topic, at the top of the content sector with subsequent topics being listed below it in order of their assigned elapsed running time from soonest to latest, unless a contrary user-generated control instruction directs otherwise.

4. The system of claim 2, wherein there are too many subject matter topics to list in their entirety within a space allotted to the content sector, and wherein the program module for displaying the first mode of the content sector, further comprises the sub-modules for:
displaying the topic associated the portion of the A/V program then being played in the presentation video sector, as indicated by the elapsed running time assigned to the topic, at the top of the content sector with all subsequent topics that will fit into the remaining content sector space being listed below in order of their assigned elapsed running time from soonest to latest, unless a contrary user-generated control instruction directs otherwise; and
displaying a scroll bar, which in response to the user using said selection device to move the bar in a first direction, scrolls the list of subject matter topics so as to progressively display topics assigned later elapsed running times in lieu of topics assigned earlier elapsed running times, and which in response to the user using said selection device to move the bar in a second direction, scrolls the list of subject matter topics so as to progressively display topics assigned earlier elapsed running times in lieu of topics assigned later elapsed running times.

5. The system of claim 2, wherein the program module for displaying the first mode of the content sector, further comprises a sub-module for:
highlighting a subject matter topic selected by the user using said selection device in lieu of any different, previously-highlighted topic.

6. The system of claim 1, wherein each of said subject matter topics is assigned an elapsed running time of the A/V program that corresponds to the beginning of a portion of the A/V program related to the particular subject matter topic, and wherein the program module for displaying the first mode of the content sector, comprises a sub-module for displaying a duration time for each topic, wherein the duration time represents the length of time the topic is covered in the presentation and is defined by the difference between the elapsed time assigned to the topic and the elapsed running time assigned to the next topic to be covered in the presentation.

7. The system of claim 1, wherein the content sector displays other information than the list of subject matter topics when operated in at least one other mode, and wherein the program module for displaying the first mode of the content sector, comprises a sub-module for displaying a contents button that when selected by the user via the selection device causes the content sector to be operated in the first mode, if it is not already, such that said list of subject matter topics is displayed therein.

8. The system of claim 7, wherein the content sector is operated in said first mode by default, and wherein the program module for displaying the first mode of the content sector, comprises a sub-module for displaying a button for each additional mode of operation which when selected by the user via the selection device causes information associated with the selected mode to be displayed in the content sector in lieu of the list of subject matter topic associated with the first mode.

9. The system of claim 1, wherein the sub-module for displaying one or more links, comprises sub-modules for:
whenever a displayed link is selected by the user via the selection device,
pausing the A/V program playing in the presentation video sector,
opening a demonstration window and playing the A/V program associated with a link in the demonstration window, and
closing the demonstration window and starting the previously paused A/V program playing in the presentation video sector when (i) the A/V program associated with a link is finished playing, or (ii) the user directs that the demonstration window be closed before it is finished playing.

10. The system of claim 1, wherein the program module for displaying the content sector, comprises sub-modules for:
displaying the content sector at a prescribed intermediate size as a default, absent any user directed resizing;
displaying in the content sector whenever shown at its prescribed intermediate size a pair of resizing buttons, wherein a first of the resizing buttons upon selection by the user increases the size of the content sector within the overall presentation viewing system window to a prescribed maximum size and decreases the size of one or more adjacent sectors to make room, and wherein the second of the resizing buttons upon selection by the user reduces the content sector to a prescribed minimum size and increases the size of one or more adjacent sectors to substantially fill the vacant space in the window left by the decrease in the content sector size;
displaying in the content sector whenever shown at its prescribed maximum size a resizing button which upon selection by the user decreases the size of the sector to its prescribed intermediate size; and
displaying in the content sector whenever shown at its prescribed minimum size a resizing button which upon selection by the user increases the size of the sector to its prescribed intermediate size.

11. An interactive, multi-media presentation viewing system, comprising:
a general purpose computing device comprising a display, user interface selection device and user interface data entry device; and
a computer program comprising program modules executable by the computing device, wherein the computing device is directed by the program modules of the computer program to display a presentation viewing system window on the display comprising a plurality of sectors, wherein
one of the program modules scales the window in overall size by scaling the size of each sector thereof based on a prescribed priority of the sector and a prescribed minimum size, wherein in response to a command from the user to decrease the overall size of the window, the reduction in size in some sectors is limited to its prescribed minimum size, and wherein whenever said command to decrease the overall size of the window would result in minimum size-limited sectors having to be reduced in size beyond their prescribed minimum size, eliminating sectors from the window in order of their assigned priority from lowest to highest instead to retain enough space in the window to accommodate the remaining sectors at no less than their prescribed minimum size, and wherein the plurality of sectors comprises,
- a presentation video sector which plays a video, audio, or audio and video program (collectively referred to hereinafter as the A/V program) associated with the presentation,
- a presentation slide sector which displays presentation slides each of which is associated with a different portion of the presentation, and
- a content sector which in a first mode comprises a display of a list of subject matter topics each of which is associated with a different portion of the presentation; and wherein said content sector is employed by a user using said selection and data entry devices to control the playing of the A/V program and the display of presentation slides.

12. The system of claim 11, wherein the program module for scaling the presentation viewing system window in overall size, further comprises rearranging the position of the remaining sectors within the window in response to said command to decrease the overall size of the window that would result in minimum size-limited sectors having to be reduced in size beyond their prescribed minimum size, to maximize the size of the remaining sectors.

13. The system of claim 11, wherein in response to a command from the user to increase the overall size of the presentation viewing system window that results in the size of the presentation slide sector being increased, said program module for scaling the window in overall size comprises a sub-module for maintaining the resolution of the presentation slide sector.

14. The system of claim 1, wherein the program module for displaying the content sector comprises a sub-module for displaying the content sector in a second mode, which comprises:
- displaying a list of transcript segments of any audio of the A/V program associated with the presentation, wherein each of said transcript segments has a prescribed length and is assigned an elapsed running time of the A/V program that corresponds to the portion of said A/V program corresponding to the beginning of the transcript segment; and
- automatically highlighting the transcript segment associated with the portion of the A/V program then being played in the presentation video sector as indicated by the elapsed running time assigned to the segment, unless a contrary user-generated control instruction directs otherwise.

15. The system of claim 14, wherein the program module for displaying the second mode of the content sector, further comprises a sub-module for automatically displaying the transcript segment associated the portion of the A/V program then being played in the presentation video sector, as indicated by the elapsed running time assigned to the segment, at the top of the content sector with subsequent segments being listed below it in order of their assigned elapsed running time from soonest to latest, unless a contrary user-generated control instruction directs otherwise.

16. The system of claim 15, wherein there are too many subject matter transcript segments to list in their entirety within a space allotted to the content sector, and wherein the program module for displaying the second mode of the content sector, further comprises the sub-modules for:
- displaying the transcript segment associated the portion of the A/V program then being played in the presentation video sector, as indicated by the elapsed running time assigned to the segment, at the top of the content sector with all subsequent transcript segments that will fit into the remaining content sector space being listed below in order of their assigned elapsed running time from soonest to latest, unless a contrary user-generated control instruction directs otherwise; and
- displaying a scroll bar, which in response to the user using said selection device to move the bar in a first direction, scrolls the list of transcript segments so as to progressively display segments assigned later elapsed running times in lieu of segments assigned earlier elapsed running times, and which in response to the user using said selection device to move the bar in a second direction, scrolls the list of transcript segments so as to progressively display segments assigned earlier elapsed running times in lieu of segments assigned later elapsed running times.

17. The system of claim 14, wherein the prescribed length of each transcript segment is one of (i) a phrase, (ii) a sentence, (iii) a prescribed number of sentences, (iv) a paragraph, or (v) a prescribed number of paragraphs.

18. The system of claim 14, wherein the program module for displaying the second mode of the content sector, further comprises sub-modules for:
- highlighting a transcript segment selected by the user using said selection device in lieu of any different, previously-highlighted segment; causing said A/V program being played in the presentation video sector to start playing at a point corresponding to the elapsed running time assigned to the selected transcript segment; and
- causing the presentation slide that is scheduled to be shown when said A/V program is at the point corresponding to the elapsed running time assigned to the selected transcript segment to be displayed in the presentation slide sector.

19. The system of claim 1, wherein the program module for displaying the content sector comprises a sub-module for displaying the content sector in a third mode, which comprises:
- displaying a sequence of thumbnail images representing the presentation slides that are available for display in the presentation slide sector, wherein each of said thumbnail images is assigned an elapsed running time of the A/V program that corresponds to the point in said A/V program that the presentation slide corresponding to the thumbnail image is scheduled to be shown in the presentation slide sector; and
- automatically highlighting the thumbnail image associated the portion of the A/V program then being played in the presentation video sector as indicated by the elapsed running time assigned to the thumbnail image, unless a contrary user-generated control instruction directs otherwise.

20. The system of claim 19, wherein the program module for displaying the third mode of the content sector, further comprises a sub-module for automatically displaying the thumbnail image associated the portion of the A/V program then being played in the presentation video sector, as indicated by the elapsed running time assigned to the image, at the upper left side of the content sector, with subsequent thumbnail images being displayed in a left to right manner in one or more rows and in the order of their assigned elapsed running time from soonest to latest, unless a contrary user-generated control instruction directs otherwise.

21. The system of claim 19, wherein there are too many subject thumbnail images to display in their entirety within a space allotted to the content sector, and wherein the program module for displaying the third mode of the content sector, further comprises the sub-modules for:

displaying the thumbnail image associated the portion of the A/V program then being played in the presentation video sector, as indicated by the elapsed running time assigned to the image, at the upper right side of the content sector with all subsequent thumbnail images that will fit into the remaining content sector space being displayed in a left to right manner in one or more rows and in order of their assigned elapsed running time from soonest to latest, unless a contrary user-generated control instruction directs otherwise; and displaying a scroll bar, which in response to the user using said selection device to move the bar in a first direction, scrolls the sequence of thumbnail images so as to progressively display images assigned later elapsed running times in lieu of images assigned earlier elapsed running times, and which in response to the user using said selection device to move the bar in a second direction, scrolls the sequence of thumbnail images so as to progressively display images assigned earlier elapsed running times in lieu of images assigned later elapsed running times.

22. The system of claim 19, wherein the program module for displaying the third mode of the content sector, further comprises sub-modules for:

highlighting a thumbnail image selected by the user using said selection device in a prescribed mode in lieu of any different, previously-highlighted thumbnail image; and causing the presentation slide that is scheduled to be shown when said A/V program is at the point corresponding to the elapsed running time assigned to the selected thumbnail image of that slide to be displayed in the presentation slide sector.

23. The system of claim 19, wherein the program module for displaying the third mode of the content sector, further comprises sub-modules for:

highlighting a thumbnail image selected by the user using said selection device in a prescribed mode in lieu of any different, previously-highlighted thumbnail image;

causing said A/V program being played in the presentation video sector to start playing at a point corresponding to the elapsed running time assigned to the selected thumbnail image; and causing the presentation slide that is scheduled to be shown when said A/V program is at the point corresponding to the elapsed running time assigned to the selected thumbnail image of that slide to be displayed in the presentation slide sector.

24. The system of claim 19, wherein the program module for displaying the third mode of the content sector, further comprises a sub-module for displaying a time indicator adjacent each thumbnail image that indicates the elapse time of said A/V program at which the presentation slide associated with the thumbnail image is scheduled to be shown in the presentation slide sector.

25. An interactive, multi-media presentation viewing system, comprising:

a general purpose computing device comprising a display, user interface selection device and user interface data entry device; and a computer program comprising program modules executable by the computing device, wherein the computing device is directed by the program modules of the computer program to display a presentation viewing system window on the display comprising a plurality of sectors comprising, a presentation video sector which plays a video, audio, or audio and video program (collectively referred to hereinafter as the A/V program) associated with the presentation, a presentation slide sector which displays presentation slides each of which is associated with a different portion of the presentation, a links sector in which a user selects links to portions of said A/V program associated with the presentation or other files, A/V programs and network sites, wherein the program module for displaying the links sector comprises sub-modules for, displaying the links sector in a first mode in which a list of links to said other files, A/V programs and network sites are displayed, opening a link window and displaying the file, A/V program or network site associated with a link in the link window whenever a displayed link is selected by the user via the selection device, and closing the link window whenever the user directs that it be closed, and a content sector which in a first mode comprises a display of a list of subject matter topics each of which is associated with a different portion of the presentation; and wherein said content sector is employed by a user using said selection and data entry devices to control the playing of the A/V program and the display of presentation slides.

26. The system of claim 25, wherein the program module for displaying the links sector further comprises a sub-module for displaying a files button that when selected by the user via the selection device causes the links sector to be operated in the first mode, if it is not already, such that said list of links to said other files, A/V programs and network sites are displayed is displayed therein.

27. The system of claim 25, wherein each link displayed in the first mode of the links sector is either associated with (i) said A/V program as a whole, (ii) a portion of the A/V program corresponding a subject matter topic displayed in the first mode of the content sector, or (iii) a presentation slide, and wherein the program module for displaying the first mode of the links sector comprises a sub-module for displaying only those links associated with the A/V program as a whole, the portion of the A/V program corresponding to the current subject matter topic and the currently displayed presentation slide.

28. The system of claim 25, wherein the program module for displaying the links sector further comprises a sub-module for displaying the links sector in a second mode, which comprises:

displaying a search request space and search results space;

displaying a search request in the form of text entered by the user via said data entry device in the search request space;

employing a search engine to find within said A/V program one or more locations wherein data pertaining to the search request can be found; and displaying a link to each location in the A/V program found to have data pertaining to the search request in the search results space.

29. The system of claim 28, wherein the sub-module for displaying the links sector in the second mode further comprises a sub-module for displaying a search details space, and wherein the sub-module for displaying a link to each location in the A/V program found to have data pertaining to the search request, comprises sub-modules for:
- highlighting a displayed link selected by the user using said selection device in a prescribed mode; and
- providing additional details about the link in the search details space.

30. The system of claim 29, wherein there is not enough space allotted to the links sector to display the search request space, search results space, and search details space in their entirety at one time, and wherein the sub-module for displaying the links sector in the second mode further comprises a sub-module for displaying a scroll bar, which in response to the user using said selection device to move the bar in a first direction scrolls the links sector spaces upward and which in response to the user using said selection device to move the bar in a second direction scrolls the links sector spaces downward such that a links sector space that the user desires to view can be brought into view.

31. The system of claim 28, wherein there are too many links found to display them in their entirety within a space allotted to the search results space, and wherein the sub-module for displaying the links sector in the second mode further comprises a sub-module for displaying a scroll bar which in response to the user using said selection device to move the bar in a first direction scrolls the list of links upwards and which in response to the user using said selection device to move the bar in a second direction scrolls the list of links downward such that any link that the user desires to view can be brought into view.

32. The system of claim 29, wherein there are too many search details to display them in their entirety within a space allotted to the search details space, and wherein the sub-module for displaying the links sector in the second mode further comprises a sub-module for displaying a scroll bar which in response to the user using said selection device to move the bar in a first direction scrolls the list of search details upwards and which in response to the user using said selection device to move the bar in a second direction scrolls the list of search details downward such that any detail that the user desires to view can be brought into view.

33. The system of claim 28, wherein the sub-module for displaying a link to each location in the A/V program found to have data pertaining to the search request, comprises sub-modules for:
- highlighting a displayed link selected by the user using said selection device in a prescribed mode;
- causing said A/V program being played in the presentation video sector to start playing at a point corresponding to link; and
- causing the presentation slide that is scheduled to be shown when said A/V program is at the point corresponding the link to be displayed in the presentation slide sector.

34. The system of claim 28, wherein the sub-module for displaying the links sector in the second mode further comprises a sub-module for displaying a clear button that when selected by the user via the selection device causes any search request or portion thereof displayed in the search request space, and any link displayed in the search results space to be cleared.

35. The system of claim 25, wherein the program module for displaying the links sector further comprises a sub-module for displaying the links sector in a third mode, which comprises:
- displaying a bookmarks space and an add button; and
- in response to the user selecting the add button using said selection device, displaying a bookmark link in the bookmarks space to the location in the A/V program playing in the presentation video sector corresponding to the current elapsed time of the A/V program.

36. The system of claim 35, wherein there are too many bookmark links created by the user to display them in their entirety within a space allotted to the bookmarks space, and wherein the sub-module for displaying the links sector in the third mode further comprises a sub-module for displaying a scroll bar which in response to the user using said selection device to move the bar in a first direction scrolls the list of bookmark links upwards and which in response to the user using said selection device to move the bar in a second direction scrolls the list of bookmark links downward such that any link that the user desires to view can be brought into view.

37. The system of claim 35, wherein the sub-module for displaying the links sector in a third mode further comprises a sub-module for displaying a remove button, and wherein a bookmark link created by the user is displayed in the bookmarks space whenever the bookmarks space is displayed, unless the user removes it, said removal comprising:
- the user selecting a displayed bookmark link using said selection device, wherein the selected bookmark link is highlighted; and
- then the user selecting the remove button with the selection device.

38. The system of claim 35, wherein the sub-module for displaying the links sector in a third mode further comprises sub-modules for:
- displaying a "goto" button;
- in response to the user selecting a displayed bookmark link using the selection device, highlighting the link; and then
- in response to the user selecting the goto button, causing said A/V program being played in the presentation video sector to start playing at a point corresponding to the elapse time associated with the highlighted bookmark link; and
- causing the presentation slide that is scheduled to be shown when said A/V program is at the point corresponding to the elapse time associated with the highlighted bookmark link to be displayed in the presentation slide sector.

39. The system of claim 35, wherein the sub-module for displaying the links sector in a third mode further comprises a sub-module which comprises, in response to the user selecting a displayed bookmark link in a prescribed manner using the selection device:
- causing said A/V program being played in the presentation video sector to start playing at a point corresponding to the elapse time associated with the highlighted bookmark link; and
- causing the presentation slide that is scheduled to be shown when said A/V program is at the point corresponding to the elapse time associated with the highlighted bookmark link to be displayed in the presentation slide sector.

40. In a computer system having a graphical user interface including a display, user interface selection device and user interface data entry device, an interactive presentation viewing process for viewing a presentation having multimedia components, comprising process actions for:
- displaying a presentation viewing window on the display, wherein the window comprises a plurality of sectors which are employed by a user using said selection and data entry devices to play a video, audio, or audio and video program, view presentation slides each of which is associated with a different portion of the program, and view a list of subject matter topics each of which is associated with a different portion of the program, and wherein the plurality of sectors comprises a presentation slide sector in which the presentation slides are displayed;

allowing the user to interact with said list of subject matter topics so as to specify what portion of the program is to be played and what presentation slide is to be viewed; and the plurality of sectors further comprises a content sector which comprises a list of transcript segments of the audio of said program, wherein each of said transcript segments is assigned an elapsed running time of the program that corresponds to the beginning of the segment, and wherein, upon selection of a transcript segment by the user using said selection device, displaying the content sector, comprises, causing said program being played in the presentation video sector to start playing at a point corresponding to the elapsed running time assigned to the selected transcript segment, and causing the presentation slide that is scheduled to be shown when said program is at the point corresponding to the elapsed running time assigned to the selected transcript segment to be displayed in the presentation slide sector, and wherein the content sector further comprises one or more links to A/V programs, other than the A/V program being played in the presentation video sector, each link being assigned an elapsed running time of the A/V program, and whenever the A/V program playing in the presentation video sector reaches the elapsed running time assigned to a link, pausing the A/V program playing in the presentation video sector, opening a demonstration window and playing the A/V program associated with a link in the demonstration window, and closing the demonstration window and starting the previously paused A/V program playing in the presentation video sector when the A/V program associated with a link is finished playing.

41. The process of claim 40, wherein the process action of displaying the presentation slide sector, comprises an action of automatically displaying the particular slide that is scheduled to be shown when the program reaches a prescribed elapsed running time, unless a contrary user-generated control instruction directs otherwise.

42. The process of claim 40, wherein the plurality of sectors further comprises a content sector which comprises a sequence of thumbnail images representing the presentation slides that are available for display in the presentation slide sector, and wherein each of said thumbnail images is assigned an elapsed running time of the program that corresponds to the elapse time that the associated slide is to be displayed in the presentation slide sector, and wherein, upon selection of a thumbnail image by the user using said selection device in a first prescribed manner, the process action of displaying the content sector, comprises an action of causing the presentation slide that is scheduled to be shown when said program is at the point corresponding to the elapsed running time assigned to the selected thumbnail image to be displayed in the presentation slide sector.

43. The process of claim 42, wherein the process action of displaying the content sector further comprises the actions of, upon selection of a thumbnail image by the user using said selection device in a second prescribed manner:

causing said program being played in the presentation video sector to start playing at a point corresponding to the elapsed running time assigned to the selected thumbnail image; and causing the presentation slide that is scheduled to be shown when said program is at the point corresponding to the elapsed running time assigned to the selected thumbnail image of that slide to be displayed in the presentation slide sector.

44. The process of claim 40, wherein the plurality of sectors further comprises a presentation links sector in which the user selects links to portions of said program or other files, programs and network sites, and wherein the process action of displaying the links sector comprises the actions of:

displaying a list of links to said other files, programs and network sites in the link sector;

opening a link window and displaying the file, program or network site associated with a link in the link window whenever a displayed link is selected by the user via the selection device; and closing the link window whenever the user directs that it be closed.

45. The process of claim 40, wherein the plurality of sectors further comprises a presentation links sector in which the user selects links to portions of said program or other files, programs and network sites, and wherein the process action of displaying the links sector comprises the actions of:

displaying a search request space and search results space in the links sector;

displaying a search request in the form of a keyword entered by the user via said data entry device in the search request space;

employing a search engine to find within a list of transcript segments of the audio of said program one or more segments comprising the keyword entered by the user; and displaying a link to each location in the program associated with a transcript segment found to comprise the keyword entered by the user in the search results space.

46. The process of claim 45, wherein the process action of displaying the links sector further comprises the actions of, upon selection of a link by the user using said selection device:

causing said program being played in the presentation video sector to start playing at a point corresponding to link; and causing the presentation slide that is scheduled to be shown when said program is at the point corresponding the link to be displayed in the presentation slide sector.

47. The process of claim 40, wherein the plurality of sectors further comprises a presentation links sector in which the user selects links to portions of said program or other files, programs and network sites, and wherein the process action of displaying the links sector comprises the actions of:

displaying a bookmarks space and an add button; and in response to the user selecting the add button using said selection device, displaying the particular subject matter topic in the bookmarks space associated with the current elapsed time of said program.

48. The process of claim 47, wherein the process action of displaying the links sector further comprises the actions of:
- displaying a "goto" button;
- in response to the user selecting a subject matter topic in the bookmarks space using the selection device, highlighting the topic; and then
- in response to the user selecting the goto button, causing said program to start playing at the beginning of the portion of the program associated with the highlighted subject matter topic; and
- causing the presentation slide that is scheduled to be shown when said program is at the point corresponding to the beginning of the portion of the program associated with the highlighted subject matter topic to be displayed.

49. The process of claim 47, wherein the process action of displaying the links sector further comprises the actions of, in response to the user selecting a subject matter topic in the bookmarks space using the selection device in a prescribed manner:
- causing said program to start playing at the beginning of the portion of the program associated with the highlighted subject matter topic; and
- causing the presentation slide that is scheduled to be shown when said program is at the point corresponding to the beginning of the portion of the program associated with the highlighted subject matter topic to be displayed.

* * * * *